US010795555B2

(12) United States Patent
Burke et al.

(10) Patent No.: US 10,795,555 B2
(45) Date of Patent: *Oct. 6, 2020

(54) STATISTICS VALUE CHART INTERFACE ROW MODE DRILL DOWN

(71) Applicant: Splunk Inc., San Francisco, CA (US)

(72) Inventors: Cory Eugene Burke, San Bruno, CA (US); Katherine Kyle Feeney, Oakland, CA (US); Divanny I. Lamas, San Francisco, CA (US); Marc Vincent Robichaud, San Francisco, CA (US); Matthew G. Ness, Oakland, CA (US); Clara E. Lee, Pacifica, CA (US)

(73) Assignee: SPLUNK INC., San Francisco, CA (US)

( * ) Notice: Subject to any disclaimer, the term of this patent is extended or adjusted under 35 U.S.C. 154(b) by 229 days.

This patent is subject to a terminal disclaimer.

(21) Appl. No.: 14/526,430

(22) Filed: Oct. 28, 2014

(65) Prior Publication Data

US 2016/0098409 A1 Apr. 7, 2016

Related U.S. Application Data

(60) Provisional application No. 62/059,988, filed on Oct. 5, 2014, provisional application No. 62/059,989, filed
(Continued)

(51) Int. Cl.
*G06F 3/048* (2013.01)
*G06F 3/0484* (2013.01)
(Continued)

(52) U.S. Cl.
CPC ........ *G06F 3/04842* (2013.01); *G06F 3/0482* (2013.01); *G06F 3/04847* (2013.01);
(Continued)

(58) Field of Classification Search
CPC .............. G06F 3/04842; G06F 3/0482; G06F 3/04847; G06F 17/246; G06F 17/30315;
(Continued)

(56) References Cited

U.S. PATENT DOCUMENTS 5,381,524 A 1/1995 Lewis et al.
5,594,673 A 1/1997 Coffin
(Continued)

OTHER PUBLICATIONS

Citation of Link to Video Available Online: Wrangling Big Data from the CPG Industry with Cloudera & Trifacta, Published Oct. 20, 2014. Available at: https://www.youtube.com/watch?v=WuBjZzq8bWw.
(Continued)

*Primary Examiner* — Linh K Pham
(74) *Attorney, Agent, or Firm* — Shook, Hardy & Bacon L.L.P.

(57) ABSTRACT

In embodiments of statistics value chart interface row mode drill down, a first interface is displayed in a table format that includes columns each with field values of an event field, and each column having a column heading of a different one of the event fields, and includes rows each with one or more of the field values, where each field value in a row is associated with a different one of the event fields, and each row includes an aggregated metric that represents a number of events having field-value pairs that match all of the one or more field values listed in a respective row and the corresponding event fields listed in the respective columns. A row can be emphasized in the first interface, and in response, a menu is displayed with selectable options to transition to a second interface that displays a listing of the events based on a selected one of the options.

30 Claims, 18 Drawing Sheets

Related U.S. Application Data on Oct. 5, 2014, provisional application No. 62/059,993, filed on Oct. 5, 2014, provisional application No. 62/060,545, filed on Oct. 6, 2014, provisional application No. 62/059,994, filed on Oct. 5, 2014, provisional application No. 62/060,551, filed on Oct. 6, 2014, provisional application No. 62/059,998, filed on Oct. 5, 2014, provisional application No. 62/060,560, filed on Oct. 6, 2014, provisional application No. 62/060,001, filed on Oct. 5, 2014, provisional application No. 62/060,567, filed on Oct. 6, 2014.

(51) Int. Cl.

| | |
|---|---|
| *G06F 3/0482* | (2013.01) |
| *G06F 16/22* | (2019.01) |
| *G06F 16/242* | (2019.01) |
| *G06F 16/248* | (2019.01) |
| *G06F 16/25* | (2019.01) |
| *G06F 16/951* | (2019.01) |
| *G06F 16/2455* | (2019.01) |
| *G06F 40/18* | (2020.01) |
| *G06K 9/20* | (2006.01) |
| *G06F 9/451* | (2018.01) |

(52) U.S. Cl.
 CPC ......... *G06F 16/221* (2019.01); *G06F 16/242* (2019.01); *G06F 16/248* (2019.01); *G06F 16/2455* (2019.01); *G06F 16/252* (2019.01); *G06F 16/951* (2019.01); *G06F 40/18* (2020.01); *G06K 9/2054* (2013.01); *G06F 9/451* (2018.02); *G06F 16/2425* (2019.01)

(58) Field of Classification Search
 CPC ......... G06F 17/30389; G06F 17/30395; G06F 17/30477; G06F 17/30551; G06F 17/30554; G06F 17/3056; G06F 17/30864; G06F 16/221; G06F 16/242; G06F 16/2455; G06F 16/951; G06F 16/248; G06F 16/252; G06F 16/2425; G06F 9/451; G06F 11/3452; G06F 16/2282; G06F 16/2246; G06F 16/25; G06F 16/282; G06K 9/2054; G06Q 10/00; G06Q 10/0637
 USPC ........................................................ 707/722
 See application file for complete search history.

(56) References Cited

U.S. PATENT DOCUMENTS

| | | | |
|---|---|---|---|
| 5,619,688 A | 4/1997 | Bosworth et al. | |
| 5,625,812 A | 4/1997 | David et al. | |
| 5,760,770 A | 6/1998 | Bliss et al. | |
| 5,787,411 A * | 7/1998 | Groff | G06F 17/30398 |
| 5,966,712 A | 10/1999 | Sabatini et al. | |
| 5,982,370 A | 11/1999 | Kamper et al. | |
| 6,072,493 A | 6/2000 | Driskell et al. | |
| 6,430,584 B1 * | 8/2002 | Comer | G06F 17/246 |
| | | | 715/212 |
| 6,438,565 B1 * | 8/2002 | Ammirato | G06F 3/0489 |
| | | | 715/204 |
| 6,493,703 B1 | 12/2002 | Knight et al. | |
| 6,513,033 B1 | 1/2003 | Trauring | |
| 6,553,317 B1 | 4/2003 | Lincoln et al. | |
| 6,597,957 B1 | 7/2003 | Beakley | |
| 6,626,959 B1 | 9/2003 | Moise et al. | |
| 6,691,254 B2 | 2/2004 | Kaler et al. | |
| 6,768,997 B2 | 7/2004 | Schirmer et al. | |
| 6,775,682 B1 | 8/2004 | Ballamkonda et al. | |
| 6,851,088 B1 | 2/2005 | Conner et al. | |
| 7,034,710 B2 | 4/2006 | Falada et al. | |
| 7,131,037 B1 | 10/2006 | LeFaive et al. | |
| 7,190,382 B1 | 3/2007 | Retlich et al. | |
| 7,324,108 B2 | 1/2008 | Hild et al. | |
| 7,461,077 B1 | 12/2008 | Greenwood | |
| 7,480,647 B1 | 1/2009 | Murstein et al. | |
| 7,583,187 B1 | 9/2009 | Cheng et al. | |
| 7,703,026 B2 | 4/2010 | Bechtold et al. | |
| 7,750,910 B2 | 7/2010 | Hild et al. | |
| 7,800,613 B2 * | 9/2010 | Hanrahan | G06F 16/248 |
| | | | 345/440 |
| 7,925,660 B2 | 4/2011 | Dieberger et al. | |
| 8,140,563 B2 | 3/2012 | Midgley | |
| 8,150,815 B2 | 4/2012 | Vian et al. | |
| 8,150,960 B2 | 4/2012 | Kumbalimutt | |
| 8,296,412 B2 | 10/2012 | Secor et al. | |
| 8,412,696 B2 | 4/2013 | Zhang et al. | |
| 8,577,911 B1 | 11/2013 | Stepinski et al. | |
| 8,583,631 B1 | 11/2013 | Ganapathi et al. | |
| 8,589,403 B2 | 11/2013 | Marquardt et al. | |
| 8,682,925 B1 | 3/2014 | Marquardt et al. | |
| 8,707,194 B1 | 4/2014 | Jenkins et al. | |
| 8,712,993 B1 | 4/2014 | Ordonez | |
| 8,752,014 B2 | 6/2014 | Harmon | |
| 8,826,434 B2 | 9/2014 | Merza | |
| 8,874,502 B2 * | 10/2014 | Williamson | G06F 16/248 |
| | | | 707/603 |
| 9,124,612 B2 | 9/2015 | Vasan et al. | |
| 9,130,971 B2 | 9/2015 | Vasan et al. | |
| 9,215,240 B2 | 12/2015 | Merza et al. | |
| 9,244,899 B1 | 1/2016 | Greenbaum | |
| 9,424,333 B1 | 8/2016 | Bisignani et al. | |
| 9,507,848 B1 | 11/2016 | Li et al. | |
| 9,921,730 B2 | 3/2018 | Burke et al. | |
| 10,139,478 B2 | 11/2018 | Gaalema et al. | |
| 10,139,997 B2 | 11/2018 | Burke et al. | |
| 10,261,673 B2 | 4/2019 | Burke et al. | |
| 10,303,344 B2 | 5/2019 | Burke et al. | |
| 10,444,956 B2 | 10/2019 | Burke et al. | |
| 2002/0049713 A1 | 4/2002 | Khemlani et al. | |
| 2002/0194166 A1 * | 12/2002 | Fowler | G06F 17/30696 |
| 2003/0100999 A1 | 5/2003 | Markowitz | |
| 2003/0217043 A1 | 11/2003 | Weiss et al. | |
| 2004/0010564 A1 | 1/2004 | Imaida et al. | |
| 2004/0030741 A1 | 2/2004 | Wolton et al. | |
| 2004/0186826 A1 | 9/2004 | Choi et al. | |
| 2004/0236757 A1 | 11/2004 | Caccavale et al. | |
| 2004/0254919 A1 | 12/2004 | Giuseppini | |
| 2005/0015624 A1 | 1/2005 | Ginter et al. | |
| 2005/0066027 A1 | 3/2005 | Hakiel et al. | |
| 2005/0086187 A1 | 4/2005 | Grosser et al. | |
| 2005/0091198 A1 | 4/2005 | Dettinger et al. | |
| 2006/0069635 A1 * | 3/2006 | Ram | G06Q 30/08 |
| | | | 705/37 |
| 2006/0100974 A1 * | 5/2006 | Dieberger | G06F 11/324 |
| 2006/0161581 A1 | 7/2006 | George et al. | |
| 2006/0161816 A1 * | 7/2006 | Gula | H04L 41/065 |
| | | | 714/39 |
| 2006/0176284 A1 | 8/2006 | Cheng | |
| 2006/0184529 A1 | 8/2006 | Berg et al. | |
| 2006/0253205 A1 * | 11/2006 | Gardiner | G05B 15/02 |
| | | | 700/19 |
| 2007/0100471 A1 | 5/2007 | Kumar et al. | |
| 2007/0100878 A1 | 5/2007 | Fielding et al. | |
| 2007/0118491 A1 | 5/2007 | Baum et al. | |
| 2007/0130585 A1 | 6/2007 | Perret et al. | |
| 2007/0214164 A1 | 9/2007 | MacLennan et al. | |
| 2007/0266149 A1 | 11/2007 | Cobb et al. | |
| 2007/0280123 A1 | 12/2007 | Atkins et al. | |
| 2008/0046805 A1 * | 2/2008 | Shewchenko | G06F 16/26 |
| | | | 715/215 |
| 2008/0071580 A1 | 3/2008 | Marcus et al. | |
| 2008/0086363 A1 | 4/2008 | Kass et al. | |
| 2008/0091466 A1 | 4/2008 | Butler et al. | |
| 2008/0104542 A1 | 5/2008 | Cohen et al. | |
| 2008/0126030 A1 | 5/2008 | Jain et al. | |
| 2008/0181123 A1 | 7/2008 | Huang et al. | |
| 2008/0215546 A1 * | 9/2008 | Baum | G06F 17/30551 |
| 2008/0228442 A1 | 9/2008 | Lippincott et al. | |
| 2008/0244582 A1 | 10/2008 | Brown et al. | |

(56) References Cited

U.S. PATENT DOCUMENTS

| | | | |
|---|---|---|---|
| 2008/0270369 A1 | 10/2008 | Myerson et al. | |
| 2009/0192985 A1 | 7/2009 | Bolls et al. | |
| 2009/0249248 A1 | 10/2009 | Burckart et al. | |
| 2009/0299998 A1 | 12/2009 | Kim | |
| 2009/0300544 A1 | 12/2009 | Psenka et al. | |
| 2009/0327852 A1* | 12/2009 | MacGregor | G06F 17/245 715/214 |
| 2010/0030888 A1 | 2/2010 | Nawabzada et al. | |
| 2010/0049692 A1 | 2/2010 | Astito et al. | |
| 2010/0057684 A1* | 3/2010 | Williamson | G06F 16/26 707/E17.014 |
| 2010/0083151 A1 | 4/2010 | Lanza et al. | |
| 2010/0122152 A1* | 5/2010 | Chamberlain | G06F 17/246 715/220 |
| 2010/0122194 A1 | 5/2010 | Rogers | |
| 2010/0205521 A1 | 8/2010 | Folting | |
| 2010/0211564 A1 | 8/2010 | Cohen et al. | |
| 2010/0228752 A1 | 9/2010 | Folting et al. | |
| 2010/0313127 A1* | 12/2010 | Gosper | G06F 17/246 715/708 |
| 2011/0032260 A1 | 2/2011 | Duggan et al. | |
| 2011/0099500 A1* | 4/2011 | Smith | G06F 3/0482 715/771 |
| 2011/0209040 A1 | 8/2011 | Zeine et al. | |
| 2011/0261055 A1 | 10/2011 | Wong et al. | |
| 2011/0264667 A1 | 10/2011 | Harizopoulos et al. | |
| 2011/0302221 A1 | 12/2011 | Tobin et al. | |
| 2011/0314148 A1 | 12/2011 | Petersen et al. | |
| 2012/0011474 A1 | 1/2012 | Kashik et al. | |
| 2012/0072817 A1 | 3/2012 | Dubey et al. | |
| 2012/0102396 A1 | 4/2012 | Arksey et al. | |
| 2012/0124072 A1 | 5/2012 | Vaidyanathan et al. | |
| 2012/0167006 A1 | 6/2012 | Tillert et al. | |
| 2012/0192066 A1 | 7/2012 | Fox et al. | |
| 2012/0246303 A1 | 9/2012 | Petersen et al. | |
| 2012/0265727 A1 | 10/2012 | Naryzhnyy et al. | |
| 2012/0265805 A1 | 10/2012 | Samdadiya et al. | |
| 2012/0317016 A1 | 12/2012 | Hughes | |
| 2013/0086587 A1 | 4/2013 | Naik et al. | |
| 2013/0151563 A1 | 6/2013 | Addepalli et al. | |
| 2013/0179793 A1 | 7/2013 | Duggan et al. | |
| 2013/0212125 A1 | 8/2013 | Wierenga et al. | |
| 2013/0305183 A1 | 11/2013 | Kumagai et al. | |
| 2013/0318236 A1 | 11/2013 | Coates et al. | |
| 2013/0332387 A1 | 12/2013 | Mirra et al. | |
| 2013/0332478 A1 | 12/2013 | Bomea et al. | |
| 2013/0332862 A1 | 12/2013 | Mirra et al. | |
| 2014/0006871 A1 | 1/2014 | Lakshmanan et al. | |
| 2014/0053070 A1* | 2/2014 | Powers | G06F 3/0484 715/708 |
| 2014/0108437 A1 | 4/2014 | Brown et al. | |
| 2014/0149393 A1 | 5/2014 | Bhatt et al. | |
| 2014/0160238 A1 | 6/2014 | Yim et al. | |
| 2014/0297666 A1 | 10/2014 | Morris | |
| 2014/0304596 A1 | 10/2014 | Chandran et al. | |
| 2014/0324862 A1 | 10/2014 | Bingham et al. | |
| 2014/0344622 A1 | 11/2014 | Huang et al. | |
| 2015/0019537 A1 | 1/2015 | Neels et al. | |
| 2015/0058318 A1 | 2/2015 | Blackwell et al. | |
| 2015/0095342 A1 | 4/2015 | Li et al. | |
| 2015/0106748 A1* | 4/2015 | Monte | G06Q 10/063 715/753 |
| 2015/0109305 A1 | 4/2015 | Black | |
| 2015/0294256 A1 | 10/2015 | Mahesh et al. | |
| 2016/0098463 A1 | 4/2016 | Burke et al. | |
| 2016/0275453 A1 | 9/2016 | Powers et al. | |
| 2016/0321589 A1 | 11/2016 | Powers et al. | |
| 2016/0350950 A1* | 12/2016 | Ritchie | G06F 40/177 |
| 2016/0357722 A1 | 12/2016 | Folting | |
| 2017/0140039 A1 | 5/2017 | Neels et al. | |
| 2019/0056853 A1 | 2/2019 | Burke et al. | |
| 2019/0250797 A1 | 8/2019 | Burke et al. | |
| 2019/0250799 A1 | 8/2019 | Burke et al. | |

OTHER PUBLICATIONS

Citation of Link to Application Available Online: Data Wrangler Application, Available at: http://vis.stanford.edu/wrangler/app. Copyright 2011-2013 Stanford Visualization Group.

Carasso, David, "Exploring Splunk", Search Processing Language (SPL) Primer and Cookbook, First Edition Published Apr. 2012, CITO Research, New York, New York, 156 pages.

Bitincka, Ledion, et al., "Optimizing Data Analysis with a Semi-Structured Time Series Database", splunk Inc., 2010 pp. 1-9.

Splunk Enterprise Security User Manual 2.0 (https://web.archive.org/web/20120712034303/http://docs.splunk.com/Documentaiton/ES/latest/User/Incident Reviewdashboard; dated Jul. 12, 2012; last accessed Nov. 21, 2016 to show the date of 2.0 user manual; and the complete PDF version of the Splunk Enterprise Security User Manual 2.0 downloaded Nov. 21, 2016—Uploaded in Two Parts.

Field Extractor App—SPLUNK (see https://www.youtube.com/watch?v=Gfl9Cm9v64Y video; dated Jul. 12, 2013.

Non-Final Office Action dated Nov. 17, 2016 in U.S. Appl. No. 14/526,478, 52 pages.

Non-Final Office Action dated Dec. 2, 2016 in U.S. Appl. No. 14/528,939, 21 pages.

Non-Final Office Action dated Jan. 11, 2017 in U.S. Appl. No. 14/526,406, 24 pages.

Non-Final Office Action dated Jan. 26, 2017 in U.S. Appl. No. 14/526,468, 49 pages.

Non-Final Office Action dated Apr. 6, 2017 in U.S. Appl. No. 14/526,380, 38 pages.

Final Office Action dated May 25, 2017 in U.S. Appl. No. 14/526,478, 36 pages.

Final Office Action dated Jul. 3, 2017 in U.S. Appl. No. 14/526,406, 25 pages.

Final Office Action dated Aug. 11, 2017 in U.S. Appl. No. 14/526,468, 34 pages.

Non-Final Office Action dated Feb. 22, 2018 in U.S. Appl. No. 14/526,406, 29 pages.

Final Office Action dated Jun. 22, 2017 in U.S. Appl. No. 14/526,380, 31 pages.

Final Office Action dated Nov. 1, 2017 in U.S. Appl. No. 14/526,380, 35 pages.

Notice of Allowance dated Nov. 16, 2017 in U.S. Appl. No. 14/526,454, 10 pages.

Non-Final Office Action dated Dec. 28, 2017 in U.S. Appl. No. 14/526,468, 30 pages.

Non-Final Office Action dated Jan. 2, 2018 in U.S. Appl. No. 14/526,478, 26 pages.

Notice of Allowance dated Jul. 13, 2018 in U.S. Appl. No. 14/526,478, 9 pages.

Final Office Action dated Jul. 16, 2018 in U.S. Appl. No. 14/526,406, 32 pages.

Non-Final Office Action dated Oct. 12, 2018 in U.S. Appl. No. 15/885,486, 15 pages.

Notice of Allowance dated Nov. 13, 2018 in U.S. Appl. No. 14/526,468, 14 pages.

Final Office Action dated Nov. 19, 2018 in U.S. Appl. No. 14/526,380, 37 pages.

Notice of Allowance dated Jan. 15, 2019 in U.S. Appl. No. 14/526,406, 9 pages.

Notice of Allowance dated Feb. 12, 2019 in U.S. Appl. No. 15/885,486, 8 pages.

Non-Final Office Action dated Apr. 17, 2019 in U.S. Appl. No. 14/526,380, 35 pages.

Notice of Allowance dated Oct. 8, 2019 in U.S. Appl. No. 16/169,815, 12 pages.

Final Office Action dated Oct. 25, 2019 in U.S. Appl. No. 14/526,380, 56 pages.

Notice of Allowance dated Feb. 24, 2020, in U.S. Appl. No. 16/169,815, 2 pages.

Non-Final Office Action dated Mar. 30, 2020, in U.S. Appl. No. 16/275,207, 32 pages.

(56) References Cited

OTHER PUBLICATIONS

"Display query system event subset—Bing," Retrieved from Internet URL: http://www.bing.com/search?q=display%20query%20system%20event%20subset&qs=n&f . . . p. 1 (Apr. 4, 2016).
"vSphere Monitoring and Performance," Update 1, vSphere 5.5, EN-001357-00, accessed at https://web.archive.org/web/20140913043828/http://pubs.vmware.com/vsphere-55/topic/com.vmware.ICbase/PDF/vsphere-esxi-vcenter-server-551-monitoring-performance-guide.pdf, accessed on Sep. 9, 2019, pp. 174.
Bumgarner, Vincent, "Implementing Splunk: Big Data Reporting and Development for Operational Intelligence", Jan. 2013, 448 pages. Available at:http://2.droppdf.com/files/ug81f/implementing-splunk.pdf.
Non-Final Office Action dated Dec. 27, 2016 in U.S. Appl. No. 14/526,454, 47 pages.
Final Office Action dated Jun. 22, 2017 in U.S. Appl. No. 14/526,454, 31 pages.
Non-Final Office Action dated Apr. 6, 2018 in U.S. Appl. No. 14/526,380, 42 pages.
Notice of Allowance dated Oct. 31, 2018 in U.S. Appl. No. 14/526,478, 2 pages.
Notice of Allowance dated Jun. 18, 2019 in U.S. Appl. No. 15/885,486, 5 pages.
Notice of Allowance dated Aug. 13, 2019 in U.S. Appl. No. 15/885,486, 2 pages.
Notice of Allowance dated Nov. 27, 2019 in U.S. Appl. No. 16/169,815, 2 pages.

\* cited by examiner

```
Original Search: 501
search "error | stats count BY host

Sent to peers: 502
search "error | prestats count BY host (map)

Executed by search head: 503
Merge prestats results received from peers (reduce)
```

| Data Summary | | | x |
|---|---|---|---|
| Hosts (5) \ Sources (8) \ Sourcetypes (3) | | | |
| filter | | | |
| Host ◊ | ▫ | Count ◊ | Last Update ◊ |
| mailsv | ▫▾ | 9,829 | 4/29/14 1:32:47.000 PM |
| vendor_sales | ▫▾ | 30,244 | 4/29/14 1:32:46.000 PM |
| www1 | ▫▾ | 24,221 | 4/29/14 1:32:44.000 PM |
| www2 | ▫▾ | 22,595 | 4/29/14 1:32:47.000 PM |
| www3 | ▫▾ | 22,975 | 4/29/14 1:32:45.000 PM |

Search Screen 600

| Search | Pivot | Reports | Alerts | Dashboards | | | Search & Reporting |
|---|---|---|---|---|---|---|---|

Q New Search  804    802                                                    Save As ▼   Close index= internal | stats count by sourcetype                                     All time ▼  Q ✓ 963,265 events (9/22/14 10:56:31.000 AM)                    Job ▼ ‖ ■ ↗ ↓ 🖨   ❗Smart Mode ▼

Events \ Patterns / Statistics (15) \ Visualization                 810

20 Per Page ▼ Format ▼ Preview ▼    808      806    812     816         808          814

| source ⇅ | sourcetype ⇅ | count ⇅ |
|---|---|---|
| /User/cburke/Desktop/Builds/branches/scrum-search-ui/etc/splunk.version | splunk_version | 1 |
| /User/cburke/Desktop/Builds/branches/scrum-search-ui/var/log/splunk/conf.log | splunkd_conf | 1 |
| /User/cburke/Desktop/Builds/branches/scrum-search-ui/var/log/splunk/license_usage.log | splunkd | 4379 |
| /User/cburke/Desktop/Builds/branches/scrum-search-ui/var/log/splunk/metrics.log | splunkd | 502771 |
| /User/cburke/Desktop/Builds/branches/scrum-search-ui/var/log/splunk/metrics.log.1 | splunkd | 76 |
| /User/cburke/Desktop/Builds/branches/scrum-search-ui/var/log/splunk/mongod.log | mongod | 2475 |
| /User/cburke/Desktop/Builds/branches/scrum-search-ui/var/log/splunk/scheduler.log | scheduler | 8023 |
| /User/cburke/Desktop/Builds/branches/scrum-search-ui/var/log/splunk/splunkd-utility.log | splunkd | 47 |
| /User/cburke/Desktop/Builds/branches/scrum-search-ui/var/log/splunk/splunkd.log | splunkd | 346348 |
| /User/cburke/Desktop/Builds/branches/scrum-search-ui/var/log/splunk/splunkd.log1 | splunkd | 1 |
| /User/cburke/Desktop/Builds/branches/scrum-search-ui/var/log/splunk/splunkd_access.log | splunkd_access | 79533 |
| /User/cburke/Desktop/Builds/branches/scrum-search-ui/var/log/splunk/splunkd_stderr.log | splunkd_stderr | 3 |
| /User/cburke/Desktop/Builds/branches/scrum-search-ui/var/log/splunk/splunkd_ui_access.log | splunkd_ui_access | 10400 |
| /User/cburke/Desktop/Builds/branches/scrum-search-ui/var/log/splunk/web_access.log | splunkd_web_access | 8665 |
| /User/cburke/Desktop/Builds/branches/scrum-search-ui/var/log/splunk/web_service.log | splunkd_web_service | 543 |

About  Support  File a Bug  Documentation  Privacy Policy

Statistics Value Chart
Interface 800

Statistics Value Chart Interface 800

Search Events Interface 828

| Search | Pivot | Reports | Alerts | Dashboards | | | | | | Search & Reporting |

Q New Search  904   902                                                          Save As ▾  Close Index=_internal | timechart count by source|                                          All time ▾  Q ✓ 262,500 of 262,500 events matched                              Job ▾ ‖ ■ ↗ ↧ 🖨    ♦ Smart Mode ▾

Events \ Patterns / Statistics (37) \ Visualization                910

20 Per Page ▾  Format ▾  Preview ▾                                               ⟨ Prev [1] 2 Next ⟩

| _time ◇ | /Users/cburke/ Desktop/Builds/ branches/scrum- search-ui/var/log/ splunk/ license_usage.log | /Users/cburke/ Desktop/Builds/ branches/scrum- search-ui/var/ log/splunk/ metrics.log | /Users/cburke/ Desktop/Builds/ branches/scrum- search-ui/var/ log/splunk/ metrics.log.1 | /Users/cburke/ Desktop/Builds/ branches/scrum- search-ui/var/ log/splunk/ mongod.log | /Users/cburke/ Desktop/Builds/ branches/scrum- search-ui/var/ log/splunk/ scheduler.log | /Users/cburke/ Desktop/Builds/ branches/scrum- search-ui/var/ log/splunk/ splunkd.log | /Users/cburke/ Desktop/Builds/ branches/scrum- search-ui/var/log/ splunk/ splunkd_access.log | /Users/cburke/Desktop/ Builds/branches/ scrum-search-ui/var/ log/splunk/ splunkd_ui_access.log | /Users/cburke/ Desktop/Builds/ branches/scrum- search-ui/var/log/ splunk/ web_access.log | /Users/cburke/ Desktop/Builds/ branches/scrum- search-ui/var/log/ splunk/ web_service.log |
|---|---|---|---|---|---|---|---|---|---|---|
| 2014-09-21 17:00:00 | 2 | 254 | 0 | 0 | 4 | 177 | 40 | 0 | 0 | 0 |
| 2014-09-21 17:30:00 | 30 | 3753 | 0 | 18 | 60 | 177 | 580 | 0 | 0 | 0 |
| 2014-09-21 18:00:00 | 32 | 3753 | 0 | 18 | 60 | 2562 | 579 | 0 | 0 | 0 |
| 2014-09-21 18:30:00 | 31 | 3753 | 0 | 18 | 60 | 2703 | 580 | 0 | 0 | 0 |
| 2014-09-21 19:00:00 | 31 | 3753 | 0 | 18 | 60 | 2703 | 580 | 0 | 0 | 0 |
| 2014-09-21 19:30:00 | 31 | 3747 | 0 | 18 | 60 | 2703 | 579 | 0 | 0 | 0 |
| 2014-09-21 20:00:00 | 34 | 3754 | 0 | 18 | 60 | 2567 | 580 | 0 | 0 | 0 |
| 2014-09-21 20:30:00 | 31 | 3747 | 0 | 18 | 60 | 2569 | 580 | 0 | 0 | 0 |
| 2014-09-21 21:00:00 | 32 | 3749 | 0 | 18 | 60 | 2556 | 580 | 0 | 0 | 0 |
| 2014-09-21 21:30:00 | 31 | 3810 | 0 | 18 | 60 | 2580 | 579 | 0 | 0 | 0 |
| 2014-09-21 22:00:00 | 31 | 3752 | 0 | 18 | 60 | 2663 | 580 | 0 | 0 | 0 |
| 2014-09-21 22:30:00 | 32 | 3751 | 0 | 18 | 60 | 2544 | 580 | 0 | 0 | 0 |
| 2014-09-21 23:00:00 | 34 | 3751 | 0 | 18 | 60 | 2545 | 579 | 0 | 0 | 0 |
| 2014-09-21 23:30:00 | 31 | 3747 | 0 | 18 | 60 | 2580 | 580 | 0 | 0 | 0 |
| 2014-09-22 00:00:00 | 33 | 3753 | 0 | 18 | 60 | 2733 | 580 | 0 | 0 | 0 |
| 2014-09-22 00:30:00 | 32 | 3755 | 0 | 18 | 60 | 2604 | 579 | 0 | 0 | 0 |
| 2014-09-22 01:00:00 | 32 | 3755 | 0 | 18 | 60 | 2558 | 580 | 0 | 0 | 0 |
| 2014-09-22 01:30:00 | 31 | 3751 | 0 | 18 | 60 | 2562 | 580 | 0 | 0 | 0 |
| 2014-09-22 02:00:00 | 34 | 3734 | 24 | 18 | 60 | 2532 | 579 | 0 | 0 | 0 |
| 2014-09-22 02:00:00 | 31 | 3749 | 0 | 18 | 60 | 2538 | 580 | 0 | 0 | 0 |

*FIG. 9A*

Statistics Time Chart Interface 900

FIG. 9B

Statistics Time Chart Interface 900

| Search | Pivot | Reports | Alerts | Dashboards | | Search & Reporting |

Q New Search    904   902                                                Save As ▼   Close Index=_internal | timechart count by source                              Date time range ▼ Q ✓ 7,011 events (9/21/14 4:00:00.000 AM to 9/21/14 4:30:00.00 AM)    910  Job ▼ ‖ ■ ⇗ ⬇ 🖨    ⚫ Smart Mode ▼

Events \ Patterns / Statistics (60) \ Visualization \

20 Per Page ▼   Format ▼   Preview ▼                                     ‹ Prev [1] 2 3 Next ›

| 940 938 _time ⬥ | /Users/cburke/Desktop/Builds/ branches/scrum-search-ui/var/log/ splunk/license_usage.log | /Users/cburke/Desktop/Builds/ branches/scrum-search-ui/ var/log/splunk/metrics.log.1 | /Users/cburke/Desktop/Builds/ branches/scrum-search-ui/ var/log/splunk/mongod.log | /Users/cburke/Desktop/Builds/ branches/scrum-search-ui/var/ log/splunk/scheduler.log | /Users/cburke/Desktop/Builds/ branches/scrum-search-ui/var/ log/splunk/splunkd.log | /Users/cburke/Desktop/Builds/ branches/scrum-search-ui/var/log/ splunk/splunkd_access.log |
|---|---|---|---|---|---|---|
| 2014-09-21 04:00:00 | 0 | 69 | 0 | 2 | 40 | 12 |
| 2014-09-21 04:00:30 | 1 | 60 | 0 | 0 | 47 | 7 |
| 2014-09-21 04:01:00 | 0 | 67 | 0 | 2 | 38 | 12 |
| 2014-09-21 04:01:30 | 1 | 60 | 0 | 0 | 38 | 8 |
| 2014-09-21 04:02:00 | 0 | 67 | 0 | 2 | 38 | 12 |
| 2014-09-21 04:02:30 | 1 | 60 | 0 | 0 | 40 | 7 |
| 2014-09-21 04:03:00 | 0 | 67 | 0 | 2 | 68 | 12 |
| 2014-09-21 04:03:30 | 1 | 60 | 0 | 0 | 46 | 7 |
| 2014-09-21 04:04:00 | 0 | 67 | 0 | 2 | 44 | 12 |
| 2014-09-21 04:04:30 | 1 | 62 | 3 | 0 | 38 | 7 |
| 2014-09-21 04:05:00 | 0 | 70 | 0 | 2 | 46 | 13 |
| 2014-09-21 04:05:30 | 1 | 64 | 0 | 0 | 57 | 7 |
| 2014-09-21 04:06:00 | 0 | 67 | 0 | 2 | 44 | 13 |
| 2014-09-21 04:06:30 | 1 | 60 | 0 | 0 | 48 | 7 |
| 2014-09-21 04:07:00 | 0 | 67 | 0 | 2 | 42 | 12 |
| 2014-09-21 04:07:30 | 1 | 60 | 0 | 0 | 40 | 7 |
| 2014-09-21 04:08:00 | 0 | 67 | 0 | 2 | 36 | 12 |
| 2014-09-21 04:08:30 | 1 | 60 | 0 | 0 | 54 | 7 |
| 2014-09-21 04:09:00 | 0 | 67 | 0 | 2 | 32 | 12 |
| 2014-09-21 04:09:30 | 1 | 64 | 3 | 0 | 46 | 7 |

About  Support  File a Bug  Documentation  Privacy Policy

Statistics Narrowed Time
Interface 936

STATISTICS VALUE CHART INTERFACE ROW MODE DRILL DOWN

RELATED APPLICATIONS

This application claims priority to U.S. Provisional Patent Application Ser. No. 62/059,988 filed Oct. 5, 2014 entitled "Event Segment Search Drill Down", the disclosure of which is incorporated by reference herein in its entirety. This application also claims priority to U.S. Provisional Patent Application Ser. No. 62/059,989 filed Oct. 5, 2014 entitled "Field Value Search Drill Down", the disclosure of which is incorporated by reference herein in its entirety. This application also claims priority to U.S. Provisional Patent Application Ser. No. 62/059,993 filed Oct. 5, 2014 and U.S. Provisional Patent Application Ser. No. 62/060,545 filed Oct. 6, 2014, both entitled "Statistics Value Chart Interface Row Mode Drill Down", the disclosures of which are incorporated by reference herein in their entirety. This application also claims priority to U.S. Provisional Patent Application Ser. No. 62/059,994 filed Oct. 5, 2014 and U.S. Provisional Patent Application Ser. No. 62/060,551 filed Oct. 6, 2014, both entitled "Statistics Time Chart Interface Row Mode Drill Down", the disclosures of which are incorporated by reference herein in their entirety. This application also claims priority to U.S. Provisional Patent Application Ser. No. 62/059,998 filed Oct. 5, 2014 and U.S. Provisional Patent Application Ser. No. 62/060,560 filed Oct. 6, 2014, both entitled "Statistics Value Chart Interface Cell Mode Drill Down", the disclosures of which are incorporated by reference herein in their entirety. This application also claims priority to U.S. Provisional Patent Application Ser. No. 62/060,001 filed Oct. 5, 2014 and U.S. Provisional Patent Application Ser. No. 62/060,567 filed Oct. 6, 2014, both entitled "Statistics Time Chart Interface Cell Mode Drill Down", the disclosures of which are incorporated by reference herein in their entirety.

BACKGROUND

Data analysts for many businesses face the challenge of making sense of and finding patterns in the increasingly large amounts of data in the many types and formats that such businesses generate and collect. For example, accessing computer networks and transmitting electronic communications across the networks generates massive amounts of data, including such types of data as machine data and Web logs. Identifying patterns in this data, once thought relatively useless, has proven to be of great value to the businesses. In some instances, pattern analysis can indicate which patterns are normal and which ones are unusual. For example, detecting unusual patterns can allow a computer system manager to investigate the circumstances and determine whether a computer system security threat exists.

Additionally, analysis of the data allows businesses to understand how their employees, potential consumers, and/or Web visitors use the company's online resources. Such analysis can provide businesses with operational intelligence, business intelligence, and an ability to better manage their IT resources. For instance, such analysis may enable a business to better retain customers, meet customer needs, or improve the efficiency of the company's IT resources. Despite the value that one can derive from the underlying data described, making sense of this data to realize that value takes effort. In particular, patterns in underlying data may be difficult to identify or understand when analyzing specific behaviors in isolation, often resulting in the failure of a data analyst to notice valuable correlations in the data from which a business can draw strategic insight.

SUMMARY

This Summary introduces features and concepts of statistics value chart interface row mode drill down, which is further described below in the Detailed Description and/or shown in the Figures. This Summary should not be considered to describe essential features of the claimed subject matter, nor used to determine or limit the scope of the claimed subject matter.

Statistics value chart interface row mode drill down is described. In embodiments, a search system exposes a statistics value chart interface for display in a table format that includes columns each with field values of an event field, and each column having a column heading of a different one of the event fields, and includes rows each with one or more of the field values, where each field value in a row is associated with a different one of the event fields, and each row includes an aggregated metric that represents a number of events having field-value pairs that match all of the one or more field values listed in a respective row and the corresponding event fields listed in the respective columns. A row of the field values and the corresponding aggregated metric can be emphasized in the first interface, and in response, a menu is displayed with options that are selectable. The menu includes the options to transition to a search events interface that displays either a listing of the events that include the field-value pairs that match all of the field values listed in the emphasized row, or other events that do not include the field-value pairs that match all of the field values listed in the emphasized row.

In embodiments, a selection of the aggregated metric in an emphasized row initiates the display of the menu with the options that include a view events option and an other events option. An input associated with the emphasized row can be received, such as when initiated by a user in the statistics value chart interface, and the menu of the options is displayed proximate the emphasized row in the statistics value chart interface. For example, the menu may pop-up or drop-down just below the emphasized row. The view events option is selectable to transition to the search events interface that displays the listing of the events that include the field-value pairs that match all of the field values listed in the emphasized row. The other events option is also selectable to transition to the search events interface that displays the listing of the other events that do not include the field-value pairs that match all of the field values listed in the emphasized row. The menu also includes a designation of a field-value pair associated with the emphasized row.

BRIEF DESCRIPTION OF THE DRAWINGS

Embodiments of statistics value chart interface row mode drill down are described with reference to the following Figures. The same numbers may be used throughout to reference like features and components that are shown in the Figures:

FIGS. 8A-8C illustrate examples of statistics search interfaces in row mode in accordance with the disclosed implementations.

FIG. 9A-9C illustrate examples of statistics search interfaces in row mode in accordance with the disclosed implementations.

DETAILED DESCRIPTION

Figure 1:
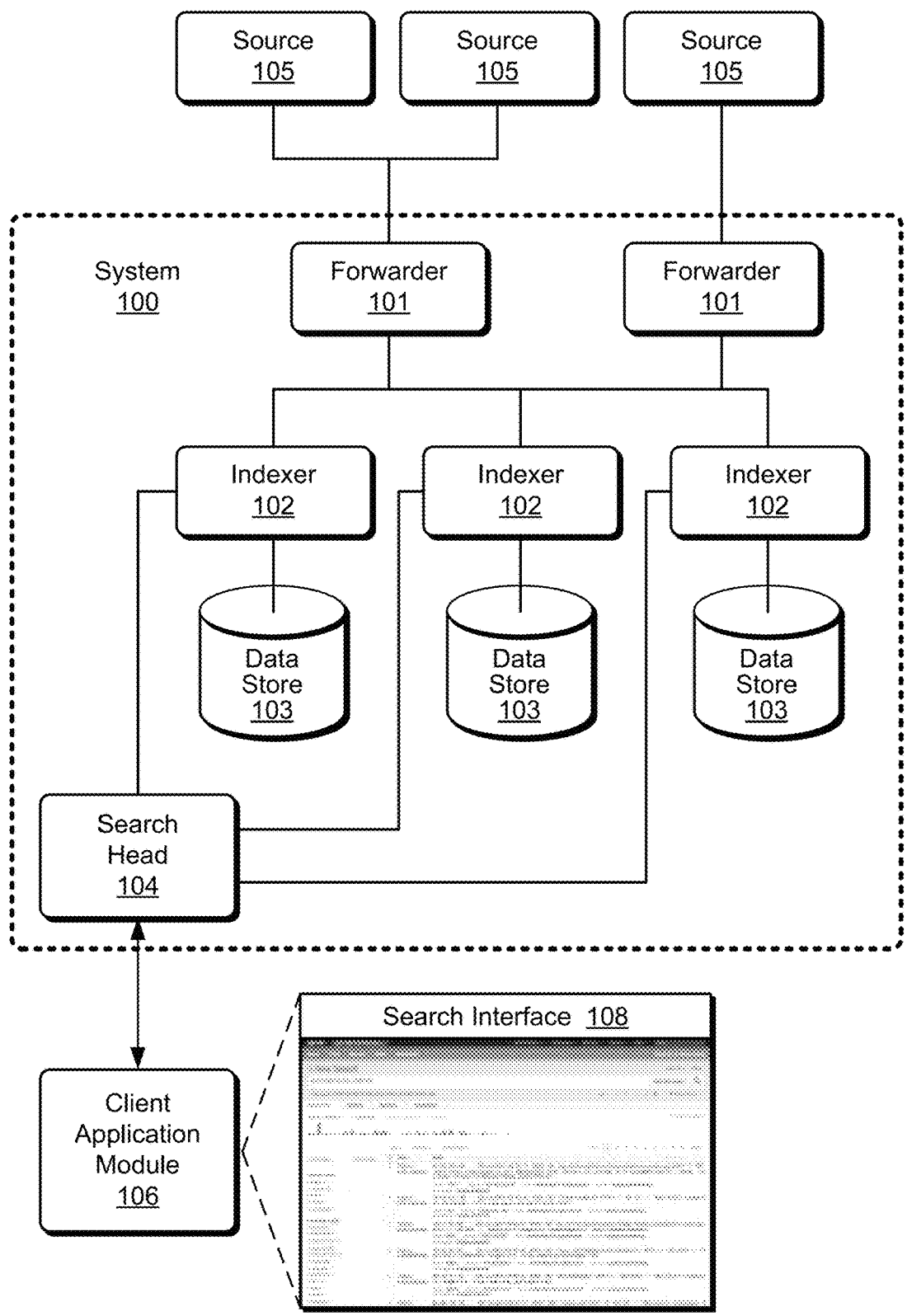
FIG. 1 illustrates a block diagram of an event-processing system in accordance with the disclosed implementations of statistics value chart interface row mode drill down.

Embodiments of statistics interface row mode search drill down are described and can be implemented to facilitate user-initiated search options when performing data searches in statistics value chart interfaces and in statistics time chart interfaces. A statistics value chart interface includes columns each with field values of an event field, and each column having a column heading of a different one of the event fields, and includes rows each with one or more of the field values, where each field value in a row is associated with a different one of the event fields, and each row includes an aggregated metric that represents a number of events having field-value pairs that match all of the one or more field values listed in a respective row and the corresponding event fields listed in the respective columns. A row of the field values and the corresponding aggregated metric can be emphasized in the statistics value chart interface, and in response, a menu is displayed with event options that are selectable. The menu includes the options to transition to a search events interface that displays either a listing of the events that include the field-value pairs that match all of the field values listed in the emphasized row, or other events that do not include the field-value pairs that match all of the field values listed in the emphasized row.

Additionally, a statistics time chart interface includes columns each having a column heading comprising a different value, each different value associated with a particular event field, and includes rows each with a time increment and one or more aggregated metrics, each aggregated metric representing a number of events having a field-value pair that matches the different value represented in one of the columns and within the time increment over which the aggregated metric is calculated. A row that includes the time increment and the aggregated metrics can be emphasized in the statistics time chart interface, and in response, a menu is displayed with options that are selectable. The menu includes the options to transition to a search events interface, or transition to a statistics narrowed time interface for the time increment in the emphasized row.

Example Environment

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," in which each event comprises a collection of performance data and/or diagnostic information that is generated by a computer system and is correlated with a specific point in time. Events can be derived from "time series data," in which time series data includes a sequence of data points (e.g., performance measurements from a computer system) that are associated with successive points in time and are typically spaced at uniform time intervals. Events can also be derived from "structured" or "unstructured" data. Structured data has a predefined format, in which specific data items with specific data formats reside at predefined locations in the data. For example, structured data can include data items stored in fields in a database table. In contrast, unstructured data does not have a predefined format. This means that unstructured data can include various data items having different data types that can reside at different locations. For example, when the data source is an operating system log, an event can include one or more lines from the operating system log containing raw data that includes different types of performance and diagnostic information associated with a specific point in time.

Examples of data sources from which an event may be derived include, but are not limited to web servers, application servers, databases, firewalls, routers, operating systems, and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, in which the flexible schema may be developed and redefined as needed. Note that a flexible schema may be applied to event data "on the fly" as desired (e.g., at search time), rather than at ingestion time of the data as in traditional database systems. Because the schema is not applied to event data until it is desired (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule includes a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques. Also, a number of "default fields" that specify metadata about the events, rather than data in the events themselves, can be created automatically. For example, such default fields can specify: a timestamp for the event data; a host from which the event data originated; a source of the event data; and a source type for the event data. These default fields may be determined automatically when the events are created, indexed, or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

Data Server System

FIG. 1 illustrates a block diagram of an example event-processing system 100, similar to the SPLUNK® ENTERPRISE system, and in which embodiments of statistics value chart interface row mode drill down can be implemented. The example event-processing system 100 includes one or more forwarders 101 that collect data obtained from a variety of different data sources 105, and one or more indexers 102 that store, process, and/or perform operations on this data, in which each indexer operates on data contained in a specific data store 103. A search head 104 may also be provided that represents functionality to obtain and process search requests from clients and provide results of the search back to the clients, additional details of which are discussed in relation to FIGS. 3 and 4. The forwarders 101, indexers 102, and/or search head 104 may be configured as separate computer systems in a data center, or alternatively may be configured as separate processes implemented via one or more individual computer systems. Data that is collected via the forwarders 101 may be obtained from a variety of different data sources 105.

As further illustrated, the search head 104 may interact with a client application module 106 associated with a client device, such as to obtain search queries and supply search results or other suitable data back to the client application module 106 that is effective to enable the client application module 106 to form search user interfaces 108 through which different views of the data may be exposed. Various examples and details regarding search interfaces 108, client application modules 106, search queries, and operation of the various components illustrated in FIG. 1 are discussed throughout this document.

During operation, the forwarders 101 identify which indexers 102 will receive the collected data and then forward the data to the identified indexers. The forwarders 101 can also perform operations to strip out extraneous data and detect timestamps in the data. The forwarders next determine which of the indexers 102 will receive each data item and then forward the data items to the determined indexers 102. Note that distributing data across the different indexers 102 facilitates parallel processing. This parallel processing can take place at data ingestion time, because multiple indexers can process the incoming data in parallel. The parallel processing can also take place at search time, because multiple indexers can search through the data in parallel.

The example event-processing system 100 and the processes described below with respect to FIGS. 1-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

Data Ingestion

Figure 2:
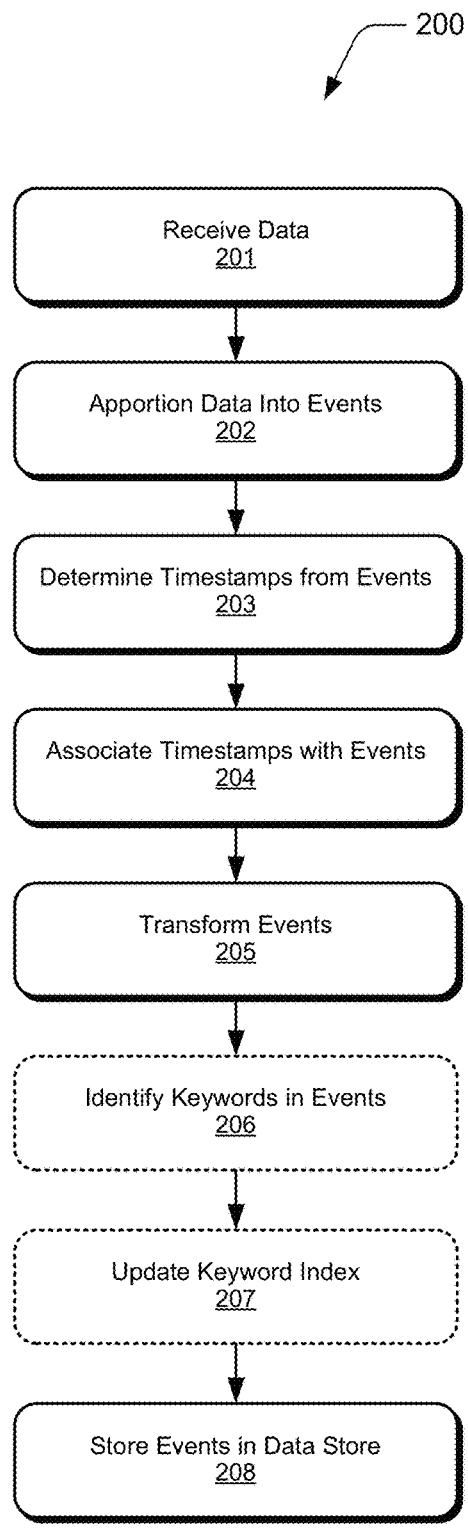
FIG. 2 illustrates a flowchart of how indexers process, index, and store data received from forwarders in accordance with the disclosed implementations.

FIG. 2 illustrates a flowchart 200 of how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, in which the indexer can be explicitly informed about the source of the data or can infer the source of the data by examining the data. These heuristic rules can include regular expression-based rules or delimiter-based rules for determining event boundaries, in which the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2" as a field-value pair.

Finally, the indexer stores the events in a data store at block 208, where a timestamp can be stored with each event to facilitate searching for events based on a time range. In some cases, the stored events are organized into a plurality of buckets, where each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on a hard disk.

Each indexer 102 is responsible for storing and searching a subset of the events contained in a corresponding data store 103. By distributing events among the indexers and data stores, the indexers can analyze events for a query in parallel, for example using map-reduce techniques, in which each indexer returns partial responses for a subset of events to a search head that combines the results to produce an answer for the query. By storing events in buckets for specific time ranges, an indexer may further optimize searching by looking only in buckets for time ranges that are relevant to a query. Moreover, events and buckets can also be replicated across different indexers and data stores to facilitate high availability and disaster recovery as is described in U.S. patent application Ser. No. 14/266,812 filed on 30 Apr. 2014, and in U.S. patent application Ser. No. 14/266,817 also filed on 30 Apr. 2014.

Query Processing

Figure 3:
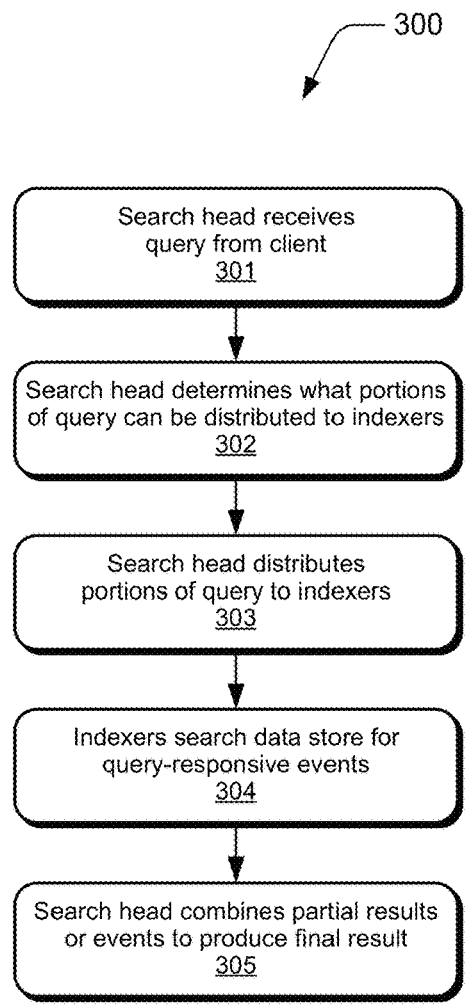
FIG. 3 illustrates a flowchart of how a search head and indexers perform a search query in accordance with the disclosed implementations.

FIG. 3 illustrates a flowchart 300 of how a search head and indexers perform a search query in accordance with the disclosed embodiments. At the start of this process, a search head receives a search query from a client (e.g., a client computing device) at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending on what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

Field Extraction

Figure 4:
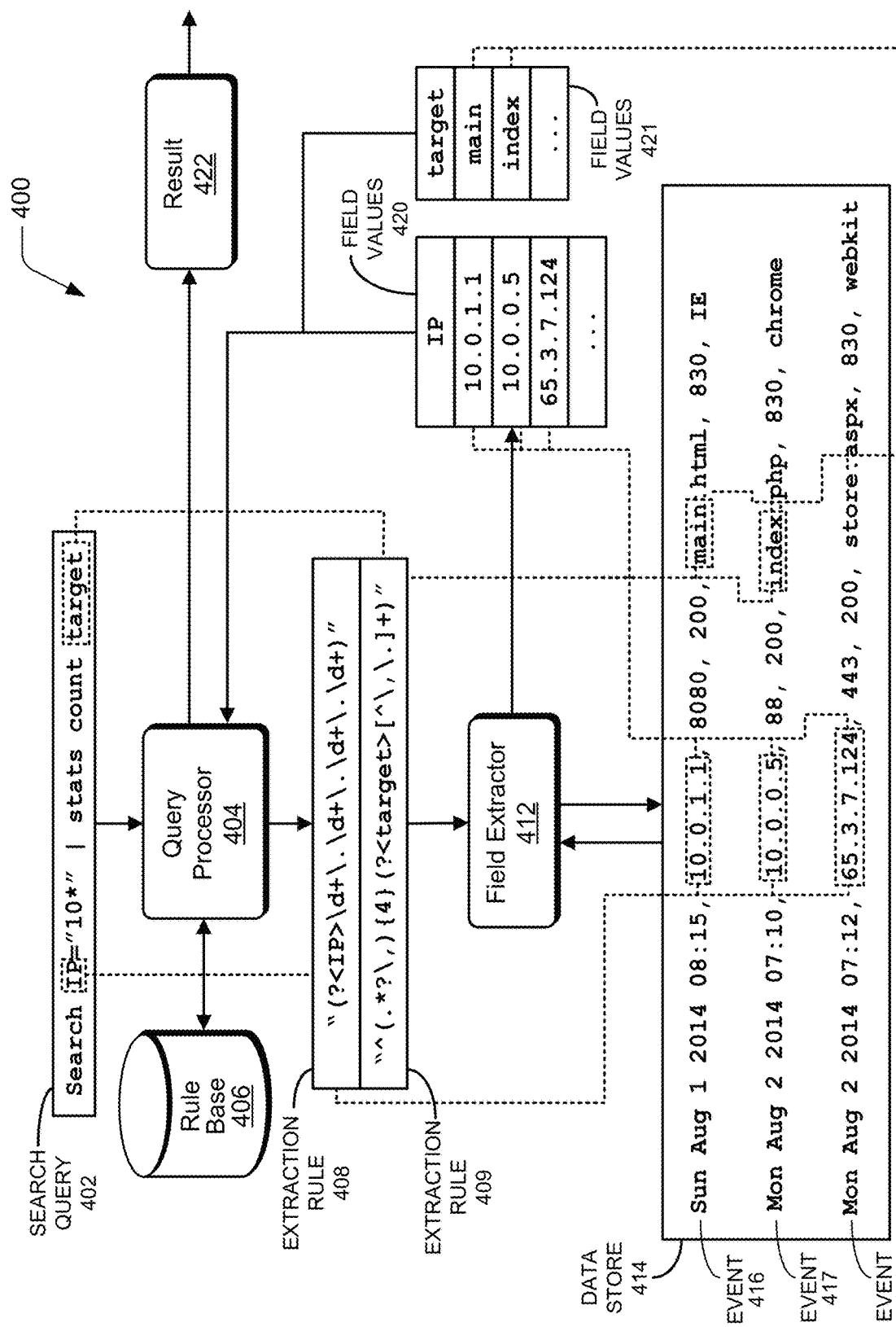
FIG. 4 illustrates a block diagram of a system for processing search requests that uses extraction rules for field values in accordance with the disclosed implementations.

FIG. 4 illustrates a block diagram 400 of how fields can be extracted during query processing in accordance with the disclosed embodiments. At the start of this process, a search query 402 is received at a query processor 404. The query processor 404 includes various mechanisms for processing a query, where these mechanisms can reside in a search head 104 and/or an indexer 102. Note that the exemplary search query 402 illustrated in FIG. 4 is expressed in Search Processing Language (SPL), which is used in conjunction with the SPLUNK® ENTERPRISE system. The SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving the search query 402, the query processor 404 identifies that the search query 402 includes two fields, "IP" and "target." The query processor 404 also determines that the values for the "IP" and "target" fields have not already been extracted from events in a data store 414, and consequently determines that the query processor 404 needs to use extraction rules to extract values for the fields. Hence, the query processor 404 performs a lookup for the extraction rules in a rule base 406, in which rule base 406 maps field names to corresponding extraction rules and obtains extraction rules 408 and 409, where extraction rule 408 specifies how to extract a value for the "IP" field from an event, and extraction rule 409 specifies how to extract a value for the "target" field from an event.

As is illustrated in FIG. 4, the extraction rules 408 and 409 can include regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, the query processor 404 sends the extraction rules 408 and 409 to a field extractor 412, which applies the extraction rules 408 and 409 to events 416-418 in the data store 414. Note that the data store 414 can include one or more data stores, and the extraction rules 408 and 409 can be applied to large numbers of events in the data store 414, and are not meant to be limited to the three events 416-418 illustrated in FIG. 4. Moreover, the query processor 404 can instruct the field extractor 412 to apply the extraction rules to all of the events in the data store 414, or to a subset of the events that have been filtered based on some criteria.

Next, the field extractor 412 applies the extraction rule 408 for the first command "Search IP="10*"" to events in the data store 414, including the events 416-418. The extraction rule 408 is used to extract values for the IP address field from events in the data store 414 by looking for a pattern of one or more digits, followed by a period, followed again by one or more digits, followed by another period, followed again by one or more digits, followed by another period, and followed again by one or more digits. Next, the field extractor 412 returns field values 420 to the query processor 404, which uses the criterion IP="10*" to look for IP addresses that start with "10". Note that events 416 and 417 match this criterion, but event 418 does not, so the result set for the first command is events 416 and 417.

The query processor 404 then sends the events 416 and 417 to the next command "stats count target." To process this command, the query processor 404 causes the field extractor 412 to apply the extraction rule 409 to the events 416 and 417. The extraction rule 409 is used to extract values for the target field for the events 416 and 417 by skipping the first four commas in the events, and then extracting all of the following characters until a comma or period is reached. Next, the field extractor 412 returns field values 421 to the query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, the query results may include: a set of one or more events; a set of one or more values obtained from the events; a subset of the values; statistics calculated based on the values; a report containing the values; or a visualization, such as a graph or chart, generated from the values.

Example Search Screen

Figure 6B:
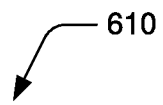
FIG. 6B illustrates a data summary dialog that enables a user to select various data sources in accordance with the disclosed implementations.
Figure 6A:
FIG. 6A illustrates a search screen in accordance with the disclosed implementations.

FIG. 6A illustrates an example of a search screen 600 in accordance with the disclosed embodiments. The search screen 600 includes a search bar 602 that accepts user input in the form of a search string. It also includes a date time range picker 612 that enables the user to specify a date and/or time range for the search. For "historical searches" the user can select a specific time range, or alternatively a relative time range, such as "today," "yesterday," or "last week." For "real-time searches," the user can select the size of a preceding time window to search for real-time events. The search screen 600 also initially displays a "data summary" dialog 610 as is illustrated in FIG. 6B that enables the user to select different sources for the event data, such as by selecting specific hosts and log files.

After the search is executed, the search screen 600 can display the results through search results tabs 604, where the search results tabs 604 include: an "Events" tab that displays various information about events returned by the search; a "Patterns" tab that can be selected to display various patterns about the events returned by the search; a "Statistics" tab that displays statistics about the search results and events; and a "Visualization" tab that displays various visualizations of the search results. The "Events" tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

Map-Reduce Technique

Figure 5:
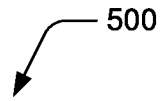
FIG. 5 illustrates an exemplary search query received from a client and executed by search peers in accordance with the disclosed implementations.

To facilitate faster query processing, a query can be structured as a map-reduce computation, wherein the "map" operations are delegated to the indexers, while the corresponding "reduce" operations are performed locally at the search head. For example, FIG. 5 illustrates an example 500 of how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head 104 when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

Keyword Index

As described above with reference to the flow charts 200 and 300 shown in respective FIGS. 2 and 3, the event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

High Performance Analytics Store

To speed up certain types of queries, some embodiments of system 100 make use of a high-performance analytics store, which is referred to as a "summarization table," that contains entries for specific field-value pairs. Each of these entries keeps track of instances of a specific value in a specific field in the event data and includes references to events containing the specific value in the specific field. For example, an entry in a summarization table can keep track of occurrences of the value "94107" in a "ZIP code" field of a set of events, where the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process each of the events that have a specific field-value combination, the system can use the references in the summarization table entry to directly access the events to extract further information without having to search each of the events to find the specific field-value combination at search time.

In some embodiments, the system maintains a separate summarization table for each of the above-described time-specific buckets that stores events for a specific time range, where a bucket-specific summarization table includes entries for specific field-value combinations that occur in events in the specific bucket. Alternatively, the system can maintain a separate summarization table for each indexer, in which the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover each of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. This is possible if results from preceding time periods can be computed separately and combined to generate an updated report. In some cases, it is not possible to combine such incremental results, for example where a value in the report depends on relationships between events from different time periods. If reports can be accelerated, the summarization engine periodically generates a summary covering data obtained during a latest non-overlapping time period. For example, where the query seeks events meeting a specified criteria, a summary for the time period includes only the events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated.

Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and in U.S. Pat. No. 8,412,696, issued on Apr. 2, 2011.

Security Features

The SPLUNK® ENTERPRISE platform provides various schemas, dashboards, and visualizations that make it easy for developers to create applications to provide additional capabilities. One such application is the SPLUNK® APP FOR ENTERPRISE SECURITY, which performs monitoring and alerting operations, and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, where the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. patent application Ser. Nos. 13/956,252, and 13/956,262. Security-related information can also include endpoint information, such as malware infection data and system configuration information, as well as access control information, such as login/logout information and access failure notifications. The security-related information can originate from various sources within a data center, such as hosts, virtual machines, storage devices, and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 7A:
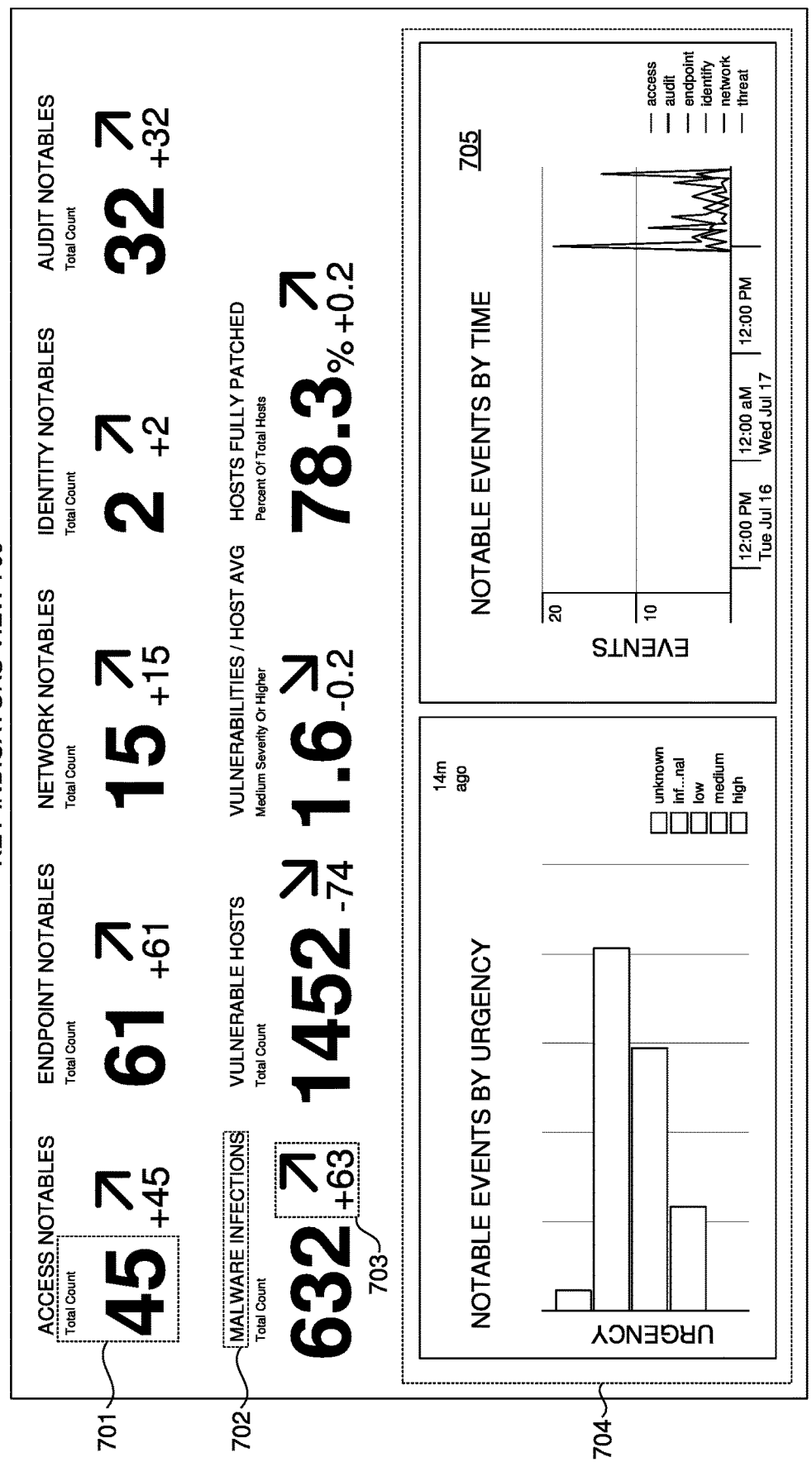
FIG. 7A illustrates a key indicators view in accordance with the disclosed implementations.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 7A illustrates an exemplary key indicators view 700 that comprises a dashboard, which can display a value 701, for various security-related metrics, such as malware infections 702. It can also display a change in a metric value 703, which indicates that the number of malware infections increased by sixty-three (63) during the preceding interval. The key indicators view 700 additionally displays a histogram panel 704 that displays a histogram of notable events organized by urgency values, and a histogram panel 705 of notable events organized by time intervals. This key indicators view is described in further detail in pending U.S. patent application Ser. No. 13/956,338 filed Jul. 31, 2013.

Figure 7B:
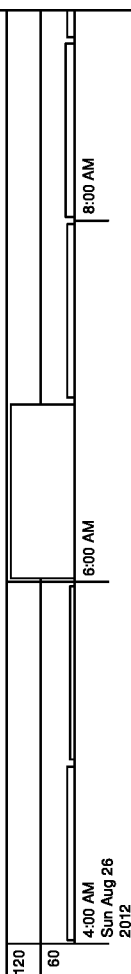
FIG. 7B illustrates an incident review dashboard in accordance with the disclosed implementations.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 7B illustrates an example of an incident review dashboard 710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of each of the notable events that match the criteria in the incident attributes fields 711. To facilitate identifying patterns among the notable events, each notable event can be associated with an urgency value (e.g., low, medium, high, or critical), which is indicated in the incident review dashboard. The urgency value for a detected event can be determined based on the severity of the event and the priority of the system component associated with the event. The incident review dashboard is described further on-line (e.g., at an HTTP:// site), "docs.splunk.com/Documentation/PCI/2.1.1/User/IncidentReviewdashboard."

Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed 29 Jan. 2014, which is hereby incorporated herein by reference. Also, see "vSphere Monitoring and Performance," Update 1, vSphere 5.5, EN-001357-00 on-line (e.g., at an HTTP:// site), "pubs.vmware.com/vsphere-55/topic/com.vmware.ICbase/PDF/vsphere-esxi-vcenter-server-551-monitoring-performance-guide.pdf."

Figure 7C:
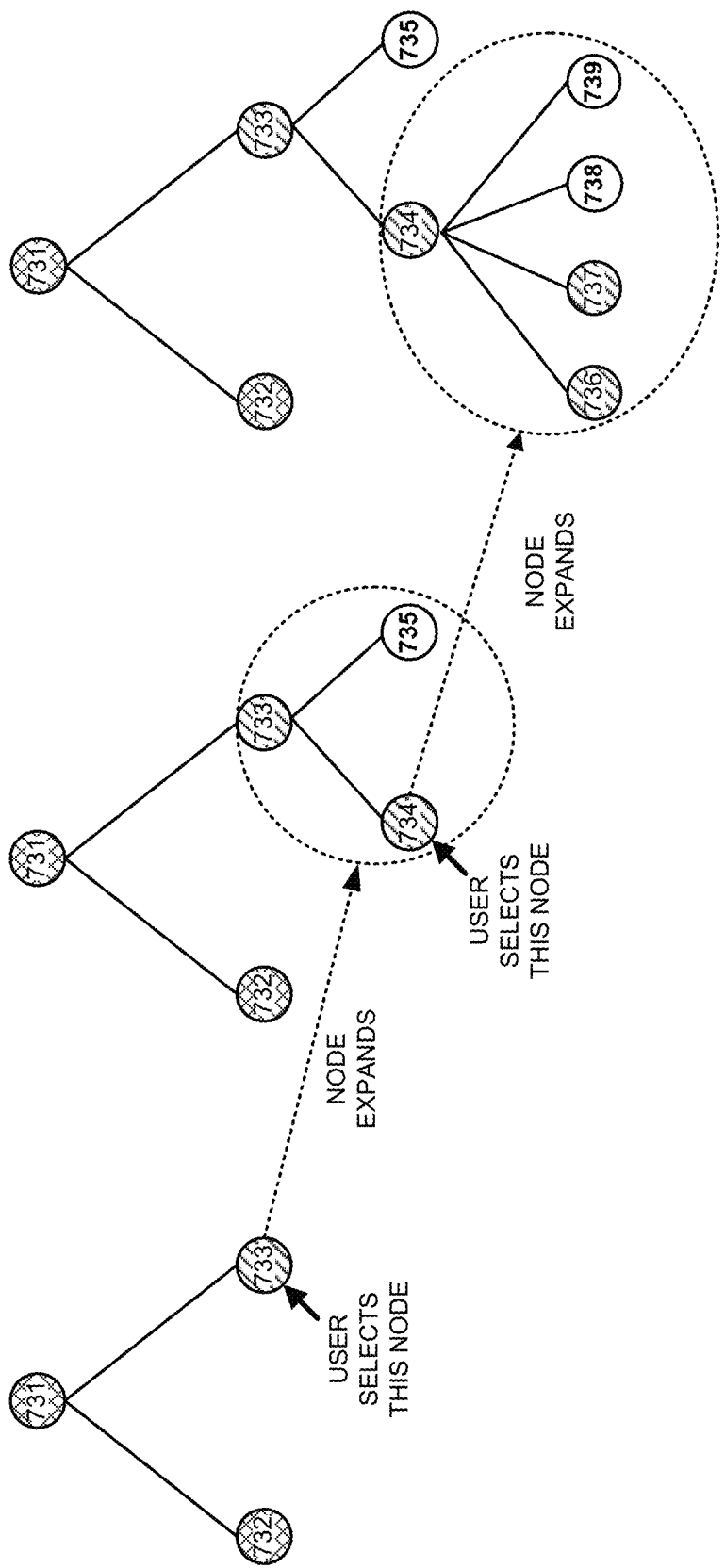
FIG. 7C illustrates a proactive monitoring tree in accordance with the disclosed implementations.

To facilitate retrieving information of interest from performance data and log files, the SPLUNK® APP FOR VMWARE® provides pre-specified schemas for extracting relevant values from different types of performance-related event data, and also enables a user to define such schemas. The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 7C, where nodes 733 and 734 are selectively expanded. Note that the nodes 731-739 can be displayed using different patterns or colors to represent different performance states, such as a critical state, a warning state, a normal state, or an unknown/off-line state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 7D:
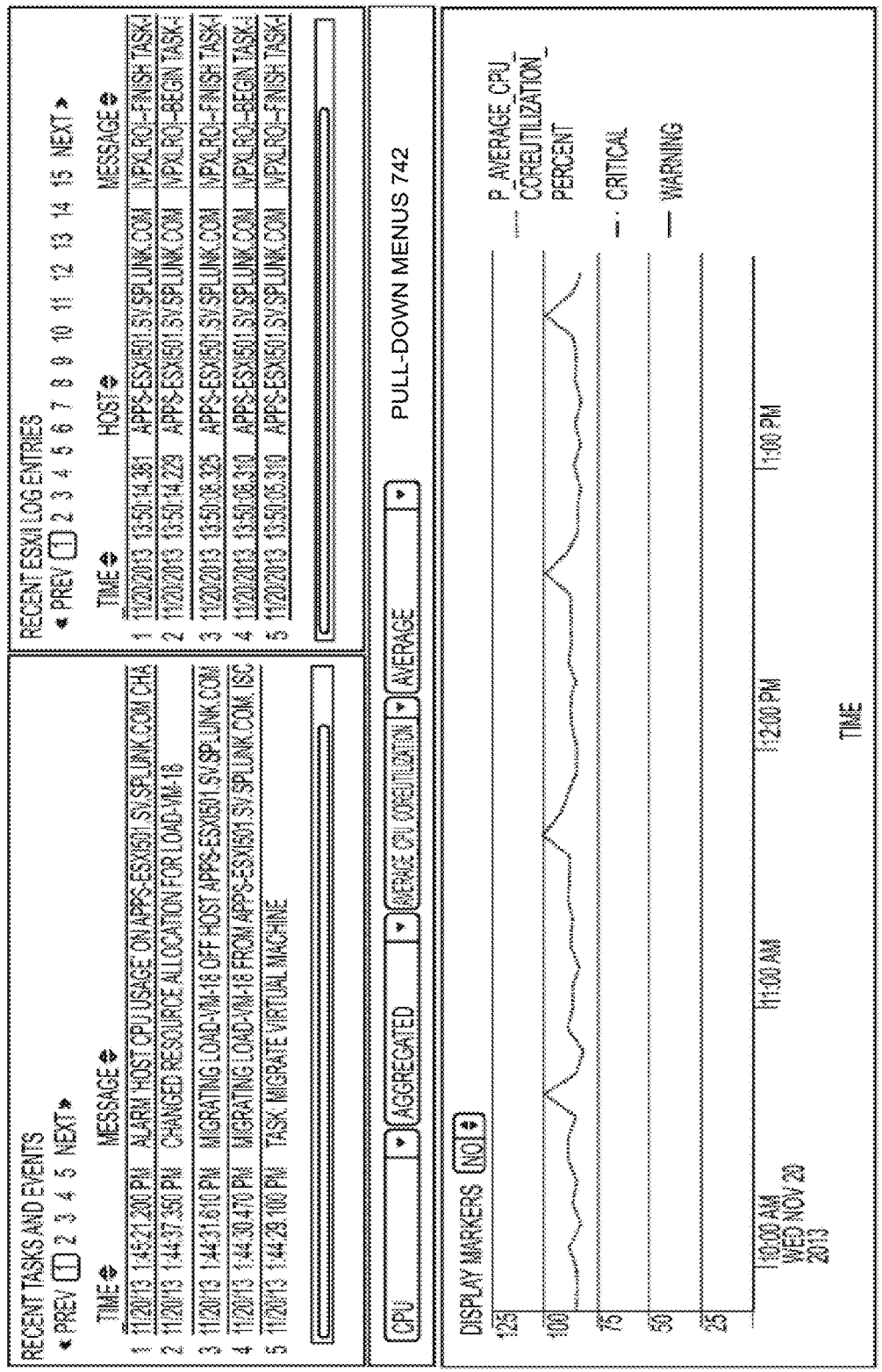
FIG. 7D illustrates a screen displaying both log data and performance data in accordance with the disclosed implementations.

The SPLUNK® APP FOR VMWARE® also provides a user interface that enables a user to select a specific time range and then view heterogeneous data, comprising events, log data, and associated performance metrics, for the selected time range. For example, the interface screen illustrated in FIG. 7D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

Statistics Value Chart Interface Row Mode Drill Down

FIG. 8A illustrates an example of a statistics value chart interface 800 displayed as a graphical user interface in accordance with the disclosed embodiments for statistics value chart interface row mode drill down. The statistics value chart interface 800 includes a search bar 802 that displays a search command 804. The statistics value chart interface 800 displays rows 806 of field values 808 for designated event fields 810. For example, the first row 812 includes the field value "/Users/cburke/Desktop . . . /etc/splunk.version" of the event field "source", and includes the field value "splunk_version" of the event field "source_type".

The statistics value chart interface 800 also includes aggregated metrics 814 that each identify the number of events having the field values 808 listed in a respective row 806 for corresponding designated event fields 810. For example, the first row 812 of the statistics value chart interface 800 has a corresponding aggregated metric of "1", indicating that one event includes both of the field-value pairs for "source=/Users/cburke/Desktop . . . /etc/splunk.version" and "source_type=splunk_version". In implementations, the aggregated metrics 814 may represent any type of metric, such as a count, an average, or a sum of events, or any other aggregating metric associated with a search result set of events. Alternatively or in addition, the aggregated metrics 814 may represent an average number of bytes downloaded, a sum of sales, or any other aggregated metric.

In implementations, a row 806 in the statistics value chart interface 800 may be highlighted or otherwise emphasized when a pointer that is displayed moves over a particular row. This feature is also referred to as highlight with rollover (e.g., detected when a pointer moves over a row). For example, a user may move a computer mouse, stylus, or other input device pointer over a row 816, which is then displayed as an emphasized row. The emphasized row can then be selected in response to a user input, such as with a mouse click or touch input to select a particular row, such as shown and described with reference to FIG. 8B.

The statistics value chart interface 800 can be displayed in a table format that includes one or more columns, each column comprising field values of an event field, and each column having a column heading comprising a different one of the event fields. The statistics value chart interface 800 also includes one or more rows, each row comprising one or more of the field values, each field value in a row associated with a different one of the event fields, and each row comprising an aggregated metric that represents a number of events having field-value pairs that match all of the one or more field values listed in a respective row and the corresponding event fields listed in the respective columns. A row of the one or more field values and the corresponding aggregated metric can be emphasized in the first interface, and in response, a menu is displayed with options that are selectable to transition to a second interface that displays a listing of the events based on a selected one of the options. In embodiments, the options are selectable to transition to the second interface that displays the listing of either the events that include the field-value pairs that match all of the one or more field values listed in the emphasized row, or other events that do not include the field-value pairs that match all of the one or more field values listed in the emphasized row.

Figure 8B:
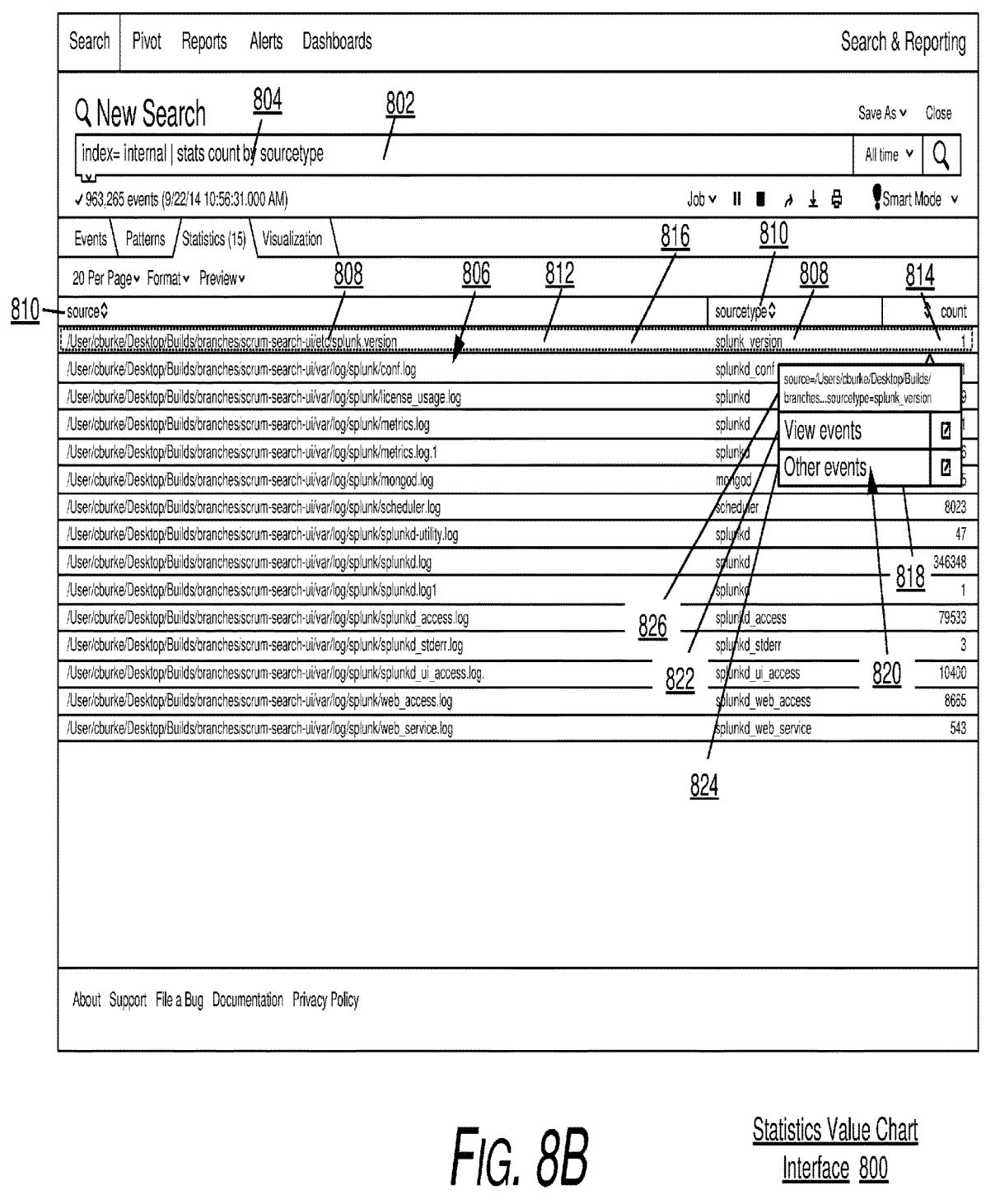

FIG. 8B further illustrates the example of the statistics value chart interface 800 described with reference to FIG. 8A in accordance with the disclosed embodiments for statistics value chart interface row mode drill down. In this example display of the statistics value chart interface 800, the row 816 is emphasized and a user has selected the emphasized row, such as with a mouse click or touch input, which initiates display of a stats event menu 818 that is displayed responsive to the user input. In implementations, the stats event menu 818 is displayed proximate the emphasized row 816 in the statistics value chart interface 800, such as a pop-up or drop-down menu just below the emphasized row.

The stats event menu 818 includes event options 820 that are selectable to transition to a search events interface that is shown and further described with reference to FIG. 8C. A user can select an event option 820 from the stats event menu 818 to drill down into events that match every single token in an emphasized row, where the "tokens" are the field values). The search events interface displays either a listing of the events that include the field values 808 listed in the emphasized row 816, or the search events interface displays other events that do not include the field values 808 listed in the emphasized row. For example, the event options 820 displayed in the stats event menu 818 include an option "View events" 822 that a user can select to transition to the search events interface that displays the listing of the events that include the field values 808 listed in the emphasized row 816. The event options 820 displayed in the stats event menu 818 also include an option "Other events" 824 that a user can select to transition to the search events interface that displays the listing of the other events that do not include the field values 808 listed in the emphasized row 816. The stats event menu 818 also includes a designation 826 of a field-value pair that is associated with the emphasized row in the statistics value chart interface. In implementations, the designation 826 indicates the one or more field-value pairs in the emphasized row.

Figure 8C:
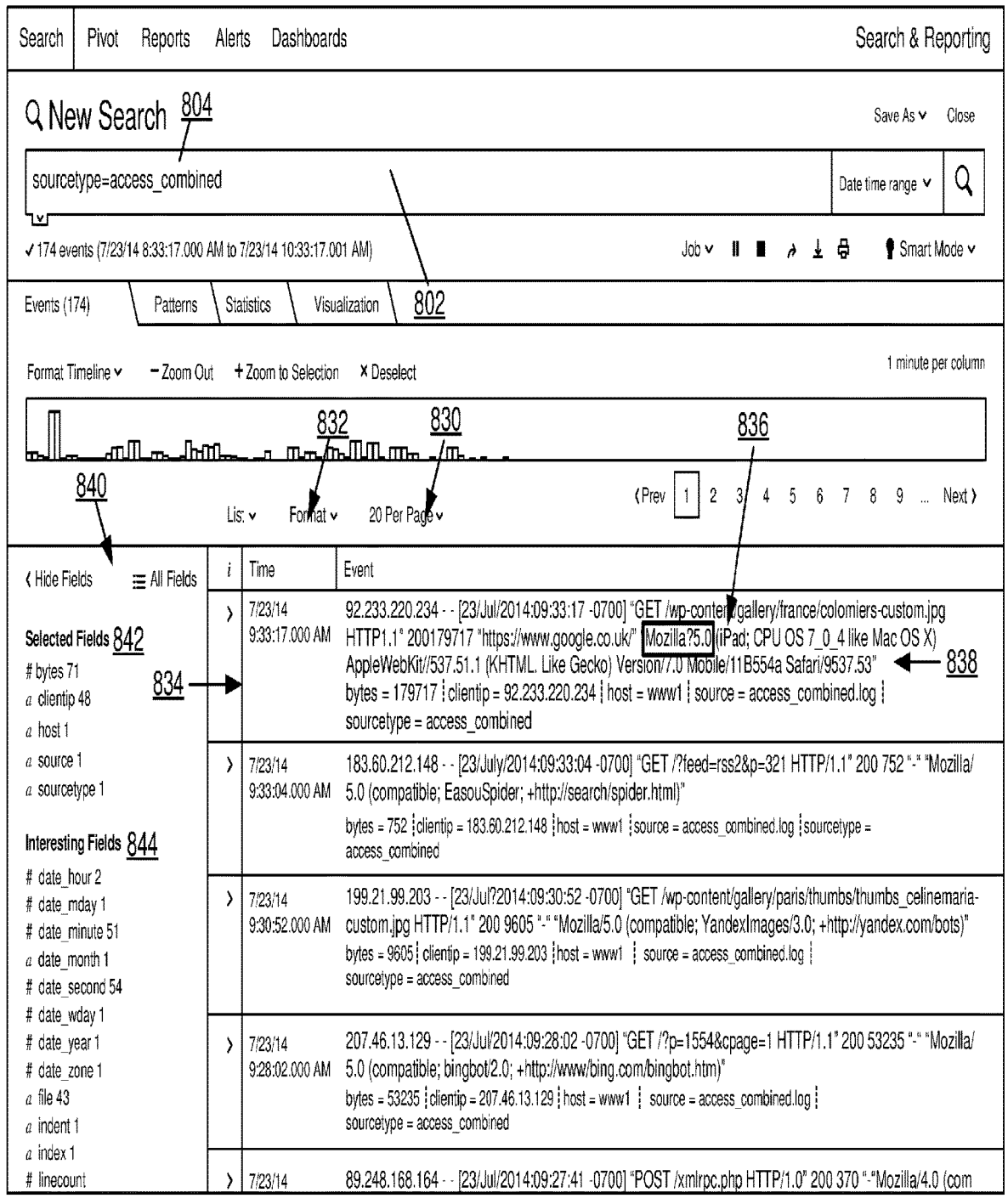

FIG. 8C illustrates an example of a search events interface 828 displayed as a graphical user interface in accordance with the disclosed implementations. The search events interface 828 includes the search bar 802 that displays a search command 804, which is "sourcetype=access_combined" in this example. The search events interface 828 also displays events 830 that are each correlated by a date and time 832. As described previously, the events 830 are a result set of performing the search command 804 that is currently displayed in the search bar 802, and only a subset of the events are shown in the search events interface. A user can scroll through the list of events 830 in the search events interface 828 to view additional events of the search result set that are not displayed.

An event 834 (e.g., the first displayed event in the list of events 830) generally includes displayed event information, depending on a selected event view from which a user can select a format to display some or all of the event information for each of the events 830 in the search events interface. In the example search events interface 828, the events 830 are displayed in a list view, in which case the displayed event information for event 834 includes event raw data 836 displayed in an upper portion of the event display area, and includes field-value pairs 838 displayed in a lower portion of the event display area. In this example, each of the events 830 include the current search command 804 (e.g., "sourcetype=access_combined") as a field-value pair 838. The search events interface 828 also includes a fields sidebar 840, which displays the selected fields 842 that are also displayed as the fields 838 for each of the events 830, and the fields sidebar 840 includes other interesting fields 844.

Statistics Time Chart Interface Row Mode Drill Down

FIG. 9A illustrates an example of a statistics time chart interface 900 displayed as a graphical user interface in accordance with the disclosed embodiments for statistics time chart interface row mode drill down. The statistics time chart interface 900 includes a search bar 902 that displays a search command 904. The statistics time chart interface 900 displays rows 906, where each row is designated by a time increment 908, and each time increment may include a date associated with the time increment. The statistics time chart interface 900 also includes columns of values 910 that are associated with an event field, such as the field "source" in the search command 904 in this example. Each row in the interface 900 includes a time increment 908 and one or more aggregated metrics 912, where each aggregated metric represents a number of events having the respective value 910 that is listed in the corresponding column and within the time increment.

For example, a row 914 in the statistics time chart interface 900 has a time increment 916 of "2014-09-21 19:00:00", and includes an aggregated metric "31" shown at 918, indicating that thirty-one events having the value 920 "/Users/cburke/Desktop . . . /splunk/license_usage.log" that is listed in the corresponding column and within the time increment 916. For a given row and given column, the aggregated number is the count of the field-value pairs that are within the designated time increment (also referred to as a "time bucket"). In implementations, the aggregated metrics 912 may represent any type of metric, such as a count, an average, or a sum of events, or any other aggregating metric associated with a search result set of events. Alternatively or in addition, the aggregated metrics 814 may represent an average number of bytes downloaded, a sum of sales, or any other aggregated metric.

In implementations, a row 906 in the statistics time chart interface 900 may be highlighted or otherwise emphasized when a pointer that is displayed moves over a particular row. This feature is also referred to as highlight with rollover (e.g., detected when a pointer moves over a row). For example, a user may move a computer mouse, stylus, or other input device pointer over a row 914, which is then displayed as an emphasized row. The emphasized row can then be selected in response to a user input, such as with a mouse click or touch input to select a particular row, such as shown and described with reference to FIG. 9B.

The statistics time chart interface 900 can be displayed in a table format that includes one or more columns, each column having a column heading comprising a different value, each different value associated with a particular event field. The statistics time chart interface 900 also includes one or more rows, each row comprising a time increment and one or more aggregated metrics, each aggregated metric representing a number of events having a field-value pair that matches the different value represented in one of the columns and within the time increment over which the aggregated metric is calculated. A row can be emphasized that includes the time increment and the one or more aggregated metrics in the emphasized row in the first interface, and in response, a menu is displayed with options that are selectable to transition to a second interface based on a selected one of the options. In embodiments, the options are selectable to transition to the second interface that displays a listing of events that include the field-value pair that matches the different value represented in one of the columns and within the time increment of the emphasized row. Alternatively, a second interface is a statistics narrowed time interface for the time increment in the emphasized row, the statistics narrowed time interface including the one or more columns each having the column heading comprising a different value associated with the particular event field as displayed in the first interface, and time metric rows, each comprising a narrowed time metric of the time increment of the emphasized row in the first interface. The time metric rows can further comprise one or more additional aggregated metrics, each additional aggregated metric representing a number of events having the field-value pair that matches the different value represented in one of the columns and within the narrowed time metric.

Figure 9B:
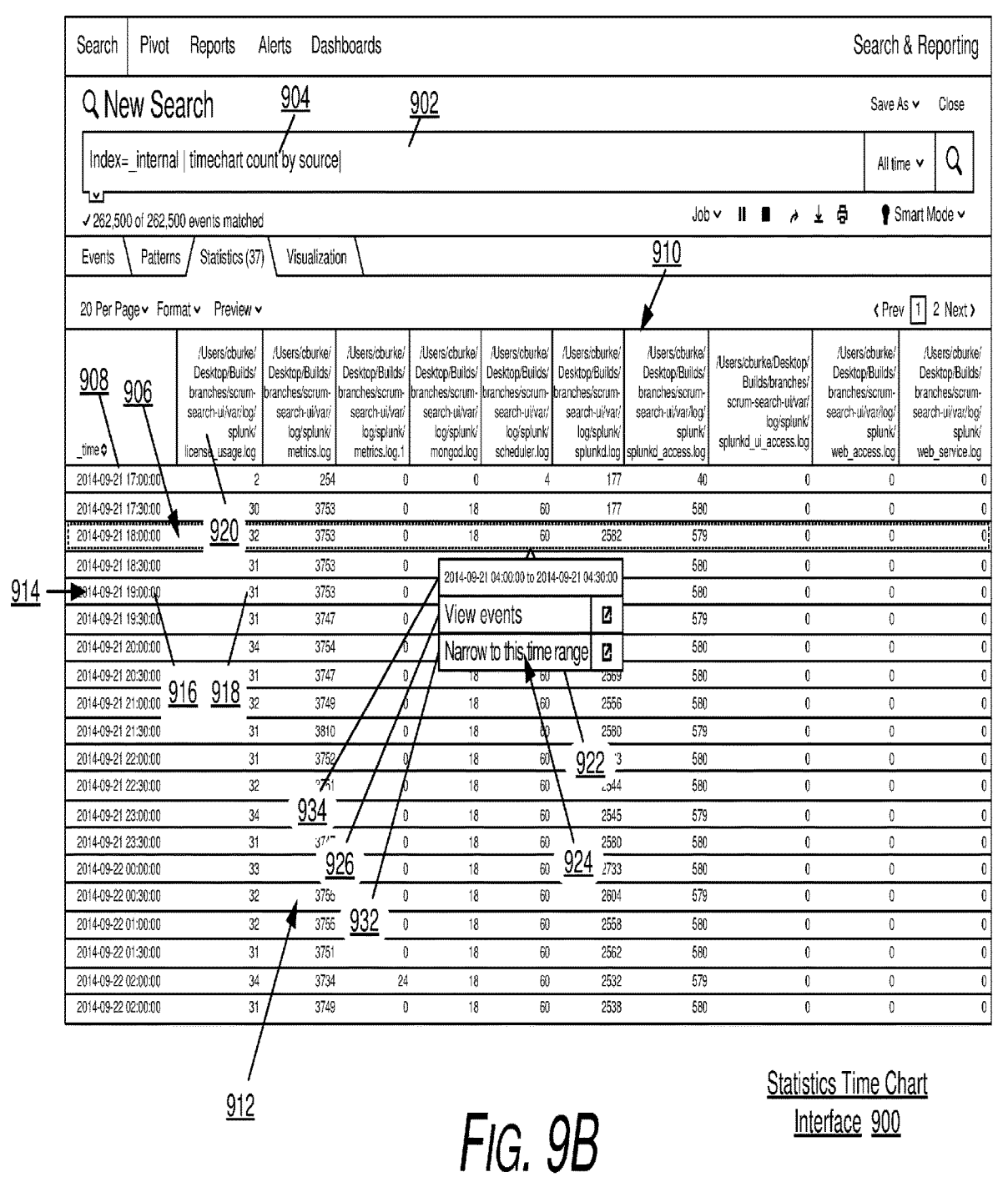

FIG. 9B further illustrates the example of the statistics time chart interface 900 described with reference to FIG. 9A in accordance with the disclosed embodiments for statistics time chart interface row mode drill down. In this example display of the statistics time chart interface 900, a user has selected the emphasized row 906, such as with a mouse click or touch input, which initiates display of a stats time range menu 922 that is displayed responsive to the user input. In implementations, the stats time range menu 922 is displayed proximate the emphasized row 906 in the statistics time chart interface 900, such as a pop-up or drop-down menu just below the emphasized row.

The stats time range menu 922 includes options 924 that are selectable to transition to the search events interface 828 that is shown and described with reference to FIG. 8C. For example, the options 924 displayed in the stats time range menu 922 include an option "View events" 926 that a user can select to transition to the search events interface 828 that displays the list of the events that include a field-value pair with the respective value 928 that is listed in the corresponding column 910 and within the time increment 930 of the emphasized row 906. A user can select the option 926 from the stats time range menu 922 to drill down into events that match the token in the emphasized row and column, where the "token" is the field value 928 in this example).

The options 924 displayed in the stats time range menu 922 also include an option "Narrow to this time range" 932 that a user can select to transition to a statistics narrowed time interface that is shown and further described with reference to FIG. 9C. The stats time range menu 922 also includes a designation 934 of a time duration that encompasses the time increment corresponding to the emphasized row. For example, the time duration is designated as "04:00:00 to 04:30:00", which encompasses the time increment 930 and is a windowed 30-minutes of time. The option "Narrow to this time range" 932 can be selected to drill down and see the events that fall into the time range between "04:00:00 to 04:30:00", as shown in the statistics narrowed time interface in FIG. 9C.

FIG. 9C illustrates an example of a statistics narrowed time interface 936 displayed as a graphical user interface in accordance with the disclosed embodiments for statistics time chart interface row mode drill down. The statistics narrowed time interface 936 includes the search bar 902 that displays the search command 904, which indicates the event field "source". The statistics narrowed time interface 936 includes the one or more columns 910 of the values associated with the event field (e.g., "source" in this example) as displayed in the statistics time chart interface 900. The statistics narrowed time interface 936 also includes time metric rows 938 that each have a narrowed time metric 940 of the time increment 908 of the emphasized row 906 in the statistics time chart interface 900. In implementations, the narrowed time metrics 940 of the time increment 908 can be incremented automatically or based on user-defined increments, or may be incremented based on any form of logical metrics, such as based on a number of events that are included in a corresponding time metric (also referred to as a time "bucket"). Each of the time metric rows 938 in the statistics narrowed time interface 936 also include one or more additional aggregated metrics 942, where each additional aggregated metric 942 identifies a number of events having the respective value that is listed in the corresponding column and within the narrowed time metric.

Example Methods

Example methods 1000 and 1100 are described with reference to respective FIGS. 10 and 11 in accordance with one or more embodiments of statistics value chart interface row mode drill down. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Computing devices (to include server devices) can be implemented with various components, such as a processing system and memory, and with any number and combination of different components as further described with reference to the example device shown in FIG. 12. One or more computing devices can implement the search system, in hardware and at least partially in software, such as executable software instructions (e.g., computer-executable instructions) that are executable with a processing system (e.g., one or more computer processors) implemented by the one or more computing devices. The search system can be stored on computer-readable, non-volatile storage memory, such as any suitable memory device or electronic data storage implemented by the computing devices.

Figure 10:
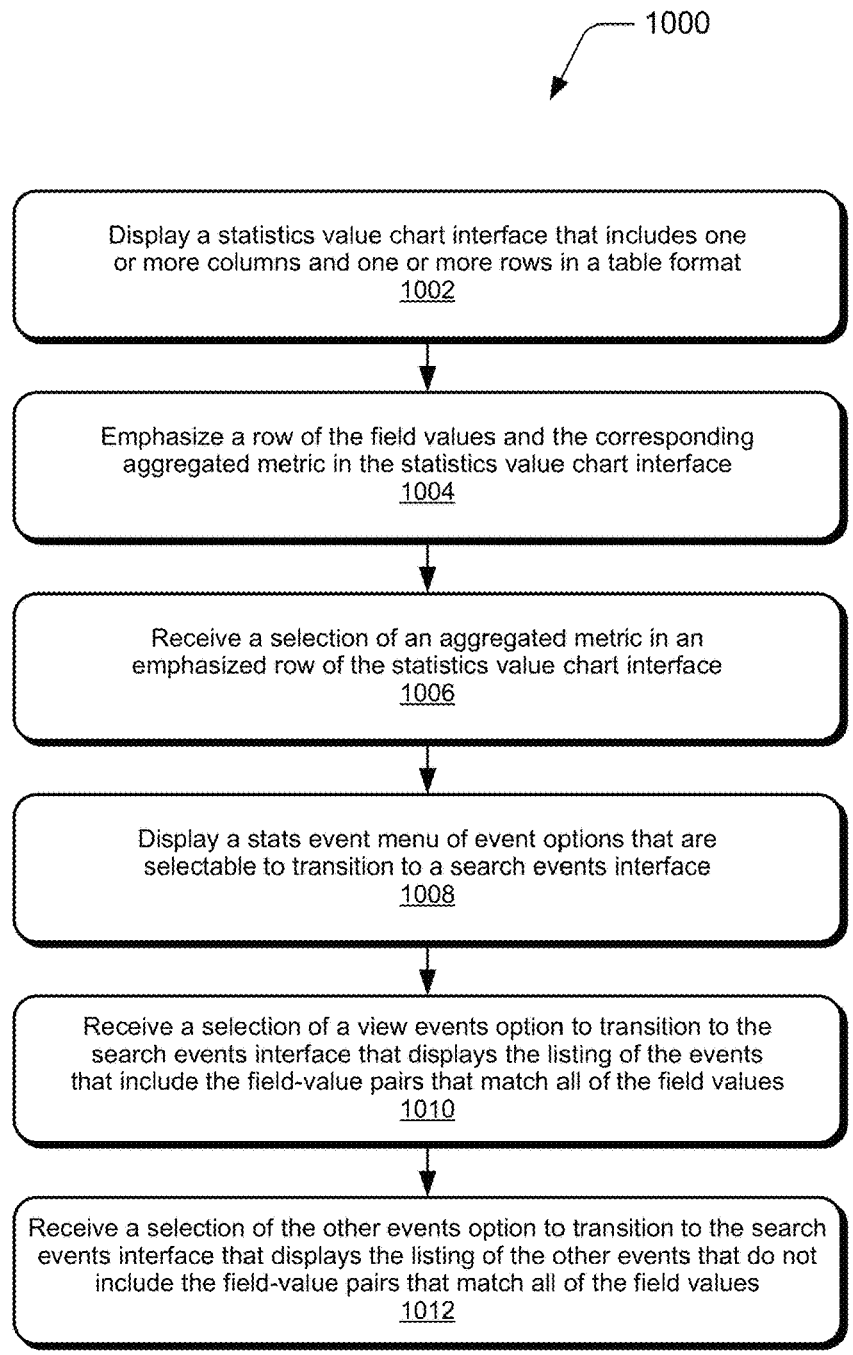
FIG. 10 illustrates example method(s) of statistics value chart interface row mode drill down in accordance with one or more embodiments.

FIG. 10 illustrates example method(s) 1000 of statistics value chart interface row mode drill down, and is generally described with reference to a statistics value chart interface. The method(s) 1000 may be implemented by a computing device, a distributed system of computing devices, and/or by one or more user client devices. The order in which a method is described is not intended to be construed as a limitation, and any number or combination of the method operations and/or methods can be performed in any order to implement a method, or an alternate method.

At 1002, a statistics value chart interface is displayed that includes one or more columns, each column comprising field values of an event field, and each column having a column heading comprising a different one of the event fields, and the interface includes one or more rows, each row comprising one or more of the field values, each field value in a row associated with a different one of the event fields, and each row comprising an aggregated metric that represents a number of events having field-value pairs that match all of the one or more field values listed in a respective row and the corresponding event fields listed in the respective columns. For example, the statistics value chart interface 800 (FIG. 8A) is displayed and includes the rows 806 of the field values 808 for designated event fields 810. The statistics value chart interface 800 also includes the aggregated metrics 814 that each identify the number of events having the field values 808 listed in a respective row 806.

At 1004, a row of the field values and the corresponding aggregated metric is emphasized in the statistics value chart interface. For example, a user may move a computer mouse, stylus, or other input device pointer over a row 816, which is then displayed as an emphasized row (e.g., highlighted or any other type of visual emphasis). The emphasized row can then be selected in response to a user input, such as with a mouse click or touch input to select a particular row.

At 1006, a selection of an aggregated metric in an emphasized row of the statistics value chart interface is received and, at 1008, a stats event menu is displayed with event options that are selectable to transition to a search events interface. For example, the aggregated metric 814 in the emphasized row 816 can be selected as a user input, such as with a mouse click or touch input to select the aggregated metric in the emphasized row. The stats event menu 818 (FIG. 8B) is then displayed with the event options 820 responsive to the received user input, and the stats event menu 818 is displayed proximate the emphasized row 816 in the statistics value chart interface 800. The event options 820 displayed in the stats event menu 818 include the option "View events" 822 and the option "Other events" 824 that a user can select to transition to the search events interface 828 (FIG. 8C).

At 1010, a selection of the view events option is received to transition to the search events interface that displays the listing of the events that include the field-value pairs that match all of the field values listed in the emphasized row. For example, a user can select the option "View events" 822 in the stats event menu 818, and the search system transitions to the search events interface 828 that displays the listing of the events 830 that include the field values 808 listed in the emphasized row 816 of the statistics value chart interface 800.

At 1012, a selection of the other events option is received to transition to the search events interface that displays the listing of the other events that do not include the field-value pairs that match all of the field values listed in the emphasized row. For example, a user can select the option "Other events" 824 in the stats event menu 818, and the search system transitions to the search events interface 828 that displays the listing of the other events 830 that do not include the field values 808 listed in the emphasized row 816 of the statistics value chart interface 800.

Figure 11:
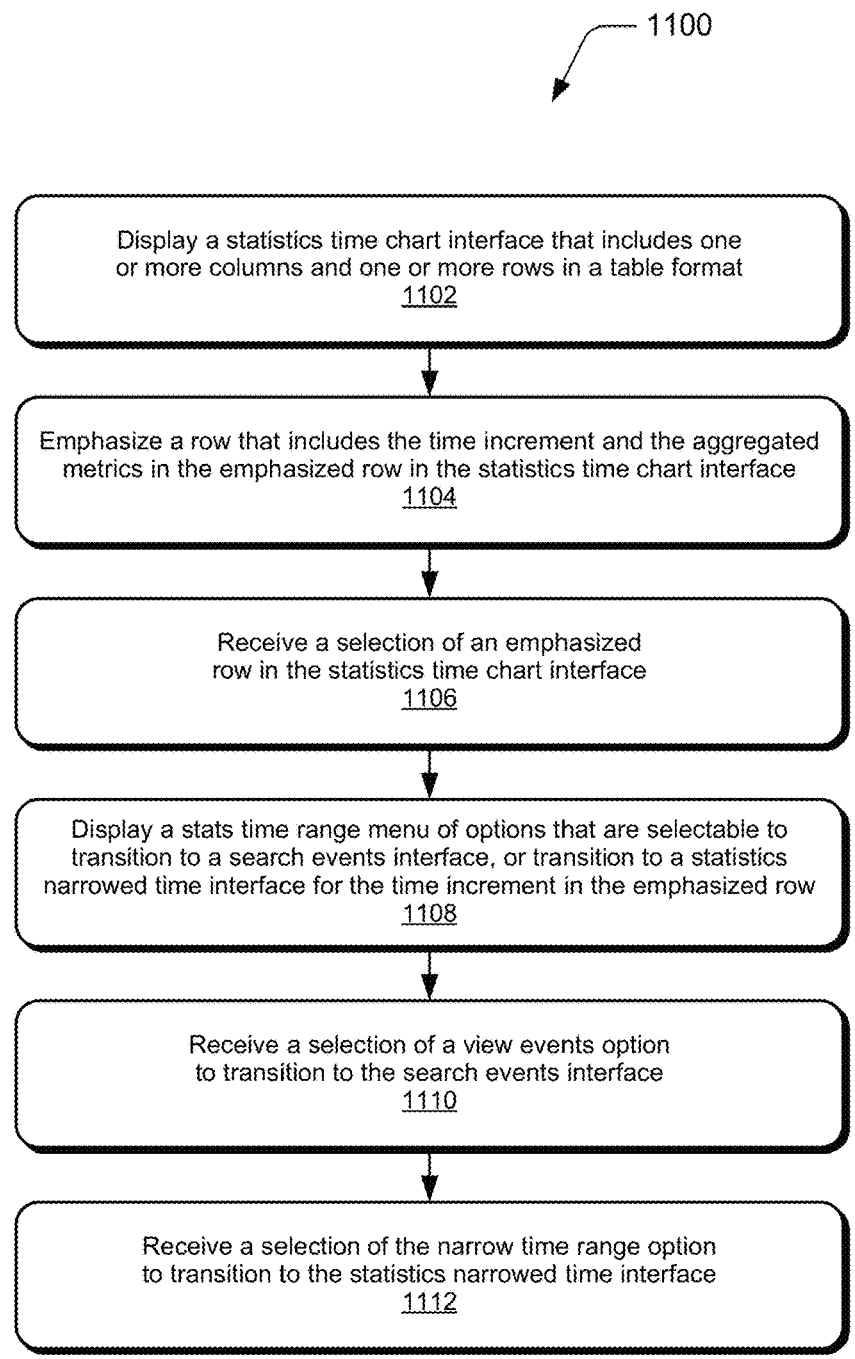
FIG. 11 illustrates example method(s) of statistics time chart interface row mode drill down in accordance with one or more embodiments.

FIG. 11 illustrates example method(s) 1100 of statistics time chart interface row mode drill down, and is generally described with reference to a statistics time chart interface. The method(s) 1100 may be implemented by a computing device, a distributed system of computing devices, and/or by one or more user client devices. The order in which a method is described is not intended to be construed as a limitation, and any number or combination of the method operations and/or methods can be performed in any order to implement a method, or an alternate method.

At 1102, a statistics time chart interface is displayed that includes one or more columns, each column having a column heading comprising a different value, each different value associated with a particular event field, and the interface includes one or more rows, each row comprising a time increment and one or more aggregated metrics, each aggregated metric representing a number of events having a field-value pair that matches the different value represented in one of the columns and within the time increment over which the aggregated metric is calculated. For example, statistics time chart interface 900 (FIG. 9A) is displayed and includes the rows 906 that are each designated by a time increment 908, and each time increment may include a date associated with the time increment. The statistics time chart interface 900 also includes the columns of values 910 that are associated with an event field. Each row in the interface 900 includes a time increment 908 and one or more aggregated metrics 912, where each aggregated metric represents a number of the events having the respective value 910 that is listed in the corresponding column and within the time increment.

At 1104, a row is emphasized that includes the time increment and the one or more aggregated metrics in the emphasized row in the statistics time chart interface. For example, a user may move a computer mouse, stylus, or other input device pointer over any of the one or more aggregated metrics 912 or the time increment 908 in a row 906, which is then displayed as an emphasized row (e.g., highlighted or any other type of visual emphasis). The emphasized row can then be selected in response to a user input, such as with a mouse click or touch input to select a particular row.

At 1106, a selection of an emphasized row in the statistics time chart interface is received and, at 1108, a stats time range menu is displayed with options that are selectable to transition to a search events interface, or transition to a statistics narrowed time interface for the time increment in the emphasized row. For example, the emphasized row 906 can be selected as a user input, such as with a mouse click or touch input to select the emphasized row. The stats time range menu 922 (FIG. 9B) is then displayed proximate the emphasized row in the statistics time chart interface 900 based on the selection of the emphasized row. The options displayed in the stats time range menu 922 include the view events option 926 and the narrow time range option 932. The stats time range menu 922 includes the designation 934 of a time duration that encompasses the time increment corresponding to the emphasized row.

At 1110, a selection of the view events option is received to transition to the search events interface. For example, a user can select the option "View events" 926 to transition to the search events interface 828 (FIG. 8C) that displays a listing of events that include the field-value pair that matches the different value represented in one of the columns and within the time increment of the emphasized row.

At 1112, a selection of the narrow time range option is received to transition to the statistics narrowed time interface. For example, a user can select the option "Narrow to this time range" 932 to transition to the statistics narrowed time interface 936 (FIG. 9C) that includes the one or more columns each having the column heading comprising a different value associated with the particular event field as displayed in the first interface, and time metric rows, each comprising a narrowed time metric of the time increment of the emphasized row in the first interface. Each of the time metric rows 938 in the statistics narrowed time interface 936 also include one or more additional aggregated metrics 942, where each additional aggregated metric 942 identifies a number of events having the field-value pair that matches the different value represented in one of the columns and within the narrowed time metric.

Example System and Device

Figure 12:
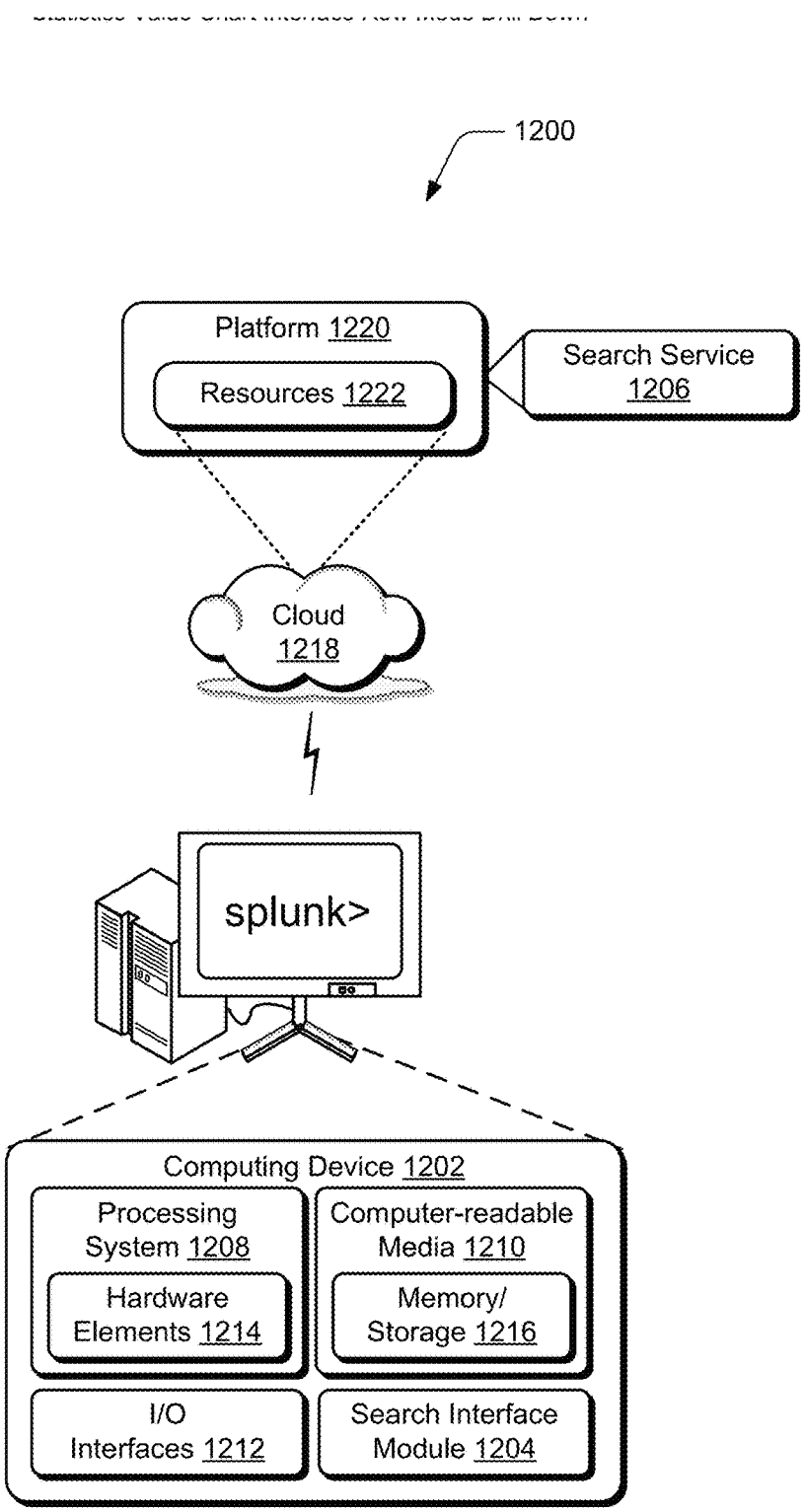
FIG. 12 illustrates an example system with an example device that can implement embodiments of statistics value chart interface row mode drill down.

FIG. 12 illustrates an example system generally at 1200 that includes an example computing device 1202 that is representative of one or more computing systems and/or devices that may implement the various techniques described herein. This is illustrated through inclusion of the search interface module 1204 that is representative of functionality to interact with a search service 1206, e.g., to specify and manage searches using a late-binding schema and events as described above and thus may correspond to the client application module 106 and system 100 of FIG. 1. The computing device 1202 may be, for example, a server of a service provider, a device associated with a client (e.g., a client device), an on-chip system, and/or any other suitable computing device or computing system.

The example computing device 1202 as illustrated includes a processing system 1208, one or more computer-readable media 1210, and one or more I/O interface 1212 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1208 is representative of functionality to perform one or more operations using hardware. Accordingly, the processing system 1208 is illustrated as including hardware element 1214 that may be configured as processors, functional blocks, and so forth. This may include implementation in hardware as an application specific integrated circuit or other logic device formed using one or more semiconductors. The hardware elements 1214 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1210 is illustrated as including memory/storage 1216. The memory/storage 1216 represents memory/storage capacity associated with one or more computer-readable media. The memory/storage component 1216 may include volatile media (such as random access memory (RAM)) and/or nonvolatile media (such as read only memory (ROM), Flash memory, optical disks, magnetic disks, and so forth). The memory/storage component 1216 may include fixed media (e.g., RAM, ROM, a fixed hard drive, and so on) as well as removable media (e.g., Flash memory, a removable hard drive, an optical disc, and so forth). The computer-readable media 1210 may be configured in a variety of other ways as further described below.

Input/output interface(s) 1212 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1214 and computer-readable media 1210 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1214. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1214 of the processing system 1208. The instructions and/or functions may be executable/operable by one or more articles of manufacture (for example, one or more computing devices 1202 and/or processing systems 1208) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1218 via a platform 1220 as described below.

The cloud 1218 includes and/or is representative of a platform 1220 for resources 1222. The platform 1220 abstracts underlying functionality of hardware (e.g., servers) and software resources of the cloud 1218. The resources 1222 may include applications and/or data that can be utilized while computer processing is executed on servers that are remote from the computing device 1202. Resources 1222 can also include services provided over the Internet and/or through a subscriber network, such as a cellular or Wi-Fi network.

The platform 1220 may abstract resources and functions to connect the computing device 1202 with other computing devices. The platform 1220 may also serve to abstract scaling of resources to provide a corresponding level of scale to encountered demand for the resources 1222 that are implemented via the platform 1220. Accordingly, in an interconnected device embodiment, implementation of functionality described herein may be distributed throughout the system 1200. For example, the functionality may be implemented in part on the computing device 1202 as well as via the platform 1220 that abstracts the functionality of the cloud 1218.

Although embodiments of statistics value chart interface row mode drill down have been described in language specific to features and/or methods, the appended claims are not necessarily limited to the specific features or methods described. Rather, the specific features and methods are disclosed as example implementations of statistics value chart interface row mode drill down, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method, comprising:
    accessing, in response to a search query, a set of events in a data store, each event of the set of events comprising a portion of raw machine data associated with a timestamp, the portion of raw machine data reflecting activity in an information technology environment, wherein the search query specifies a set of fields and a computation to perform to produce aggregated metrics for the set of events;
    causing display of a first interface comprising a table, the table including a header row and a set of rows,
    wherein a cell of the header row includes a value of a field-value pair of a field from the set of fields,
    wherein a row of the set of rows includes a time increment and a plurality of the aggregated metrics associated with a subset of the set of events that are within the time increment over which the plurality of the aggregated metrics is calculated for the row, and
    wherein a particular aggregated metric of the plurality of the aggregated metrics in a particular column of the row is associated with the value of the field-value pair in the cell of the header row;
    causing display of a menu of options in response to input indicating a selection of the row, the menu of options including an option that selects additional information about a particular subset of the set of events and requires each event in the particular subset of the set of events to not have the value in the cell of the header row, wherein the particular subset of the events is determined based at least on the time increment included in the row; and
    causing display of a second interface in response to input indicating a selection of the option, wherein display of the second interface causes the second interface to replace the first interface, wherein the second interface includes a second table displaying the additional information about the particular subset of the set of events.

2. The method as recited in claim 1, wherein no event in the particular subset of the set of events has a different value in a different cell of the header row based at least on the selection of the option.

3. The method as recited in claim 1, wherein all events in the particular subset of the set of events have a different value in a different cell of the header row based at least on the selection of the option, and the second table includes a respective portion of raw machine data of each event in the particular subset of the set of events.

4. The method as recited in claim 1, wherein no event in the particular subset of the set of events has the value in the cell of the header row, and the second table includes a respective portion of raw machine data of each event in the particular subset of the set of events.

5. The method as recited in claim 1, wherein the selection of the row of the set of rows is indicated by a selection of a particular aggregated metric in the row.

6. The method as recited in claim 1, wherein a different option of the options requires each event in the particular subset of the set of events to have the value in the cell of the header row.

7. The method as recited in claim 1, wherein the option further requires each event in the particular subset of the set of events to not have a different value in a different cell of the header row.

8. The method as recited in claim 1, wherein the event in the particular subset of the set of events is within the time increment of the row based at least on the selection of the row.

9. The method as recited in claim 1, wherein the set of events are initially derived from collected data that comprises at least one of raw data, machine data, performance data, log data, diagnostic information, transformed data, or mashup data combined from multiple sources.

10. The method as recited in claim 1, wherein the set of events are returned as a result of executing the search query, wherein executing of the search query includes using a late-binding schema on data originally collected from one or more sources.

11. The method as recited in claim 1, wherein each row of the set of rows corresponds to a different time increment and a different set of the aggregated metrics.

12. The method as recited in claim 1, wherein each cell in the header row includes a different value of a different field-value pair of the field.

13. The method as recited in claim 1, wherein each aggregated metric of the plurality of the aggregated metrics in the row corresponds to a different value of a different field-value pair of the field.

14. A computer-implemented system, comprising:
    one or more processors; and
    one or more computer-readable media comprising instructions that are executable to cause the one or more processors to perform operations comprising:
    accessing, in response to a search query, a set of events in a data store, each event of the set of events comprising a portion of raw machine data associated with a timestamp, the portion of raw machine data reflecting activity in an information technology environment, wherein the search query specifies a set of fields and a computation to perform to produce aggregated metrics for the set of events;
    causing display of a first interface comprising a table, the table including a header row and a set of rows,
    wherein a cell of the header row includes a value of a field-value pair of a field from the set of fields,
    wherein a row of the set of rows includes a time increment and a plurality of the aggregated metrics associated with a subset of the set of events that are within the time increment over which the plurality of the aggregated metrics is calculated for the row, and
    wherein a particular aggregated metric of the plurality of the aggregated metrics in a particular column of the row is associated with the value of the field-value pair in the cell of the header row;
    causing display of a menu of options in response to input indicating a selection of the row, the menu of options including an option that selects additional information about a particular subset of the set of events and requires each event in the particular subset of the set of events to not have the value in the cell of the header row, wherein the particular subset of the events is determined based at least on the time increment included in the row; and causing display of a second interface in response to input indicating a selection of the option, wherein display of the second interface causes the second interface to replace the first interface, wherein the second interface includes a second table displaying the additional information about the particular subset of the set of events.

15. The system as recited in claim 14, wherein no event in the particular subset of the set of events has a different value in a different cell of the header row based at least on the selection of the option.

16. The system as recited in claim 14, wherein the computation to perform to produce the aggregated metrics is an average.

17. The system as recited in claim 14, wherein each event in the particular subset of the events is within the time increment of the row based at least on the selection of the row.

18. The system as recited in claim 14, wherein all events in the particular subset of the set of events have a different value in a different cell of the header row based at least on the selection of the option, and the second table includes a respective portion of raw machine data of each event in the particular subset of the set of events.

19. The system as recited in claim 14, wherein no event in the particular subset of the set of events has the value in the cell of the header row, and the second table includes a respective portion of raw machine data of each event in the particular subset of the set of events.

20. The system as recited in claim 14, wherein a different option of the options requires each event in the particular subset of the set of events to have the value in the cell of the header row.

21. The system as recited in claim 14, wherein the option further requires each event in the particular subset of the set of events to not have a different value in a different cell of the header row.

22. The system as recited in claim 14, wherein the set of events are initially derived from collected data that comprises at least one of raw data, machine data, performance data, log data, diagnostic information, transformed data, or mashup data combined from multiple sources.

23. The system as recited in claim 14, wherein the set of events are returned as a result of executing the search query, wherein executing of the search query includes using a late-binding schema on data originally collected from one or more sources.

24. One or more computer-readable, non-transitory storage memory comprising stored instructions that are executable and, responsive to execution by a computing device, the computing device performs operations comprising:

accessing, in response to a search query, a set of events in a data store, each event of the set of events comprising a portion of raw machine data associated with a timestamp, the portion of raw machine data reflecting activity in an information technology environment, wherein the search query specifies a set of fields and a computation to perform to produce aggregated metrics for the set of events;

causing display of a first interface comprising a table, the table including a header row and a set of rows, wherein a cell of the header row includes a value of a field-value pair of a field from the set of fields, wherein a row of the set of rows includes a time increment and a plurality of the aggregated metrics associated with a subset of the set of events that are within the time increment over which the plurality of the aggregated metrics is calculated for the row, and wherein a particular aggregated metric of the plurality of the aggregated metrics in a particular column of the row is associated with the value of the field-value pair in the cell of the header row;

causing display of a menu of options in response to input indicating a selection of the row, the menu of options including an option that selects additional information about a particular subset of the set of events and requires each event in the particular subset of the set of events to not have the value in the cell of the header row, wherein the particular subset of the events is determined based at least on the time increment included in the row; and causing display of a second interface in response to input indicating a selection of the option, wherein display of the second interface causes the second interface to replace the first interface, wherein the second interface includes a second table displaying the additional information about the particular subset of the set of events.

25. The one or more computer-readable, non-volatile storage memory as recited in claim 24, wherein no event in the particular subset of the set of events has a different value in a different cell of the header row based at least on the selection of the option.

26. The one or more computer-readable, non-volatile storage memory as recited in claim 24, wherein a different option of the options requires each event in the particular subset of the set of events to have the value in the cell of the header row.

27. The one or more computer-readable, non-volatile storage memory as recited in claim 24, wherein each event in the particular subset of the events is within the time increment of the row based at least on the selection of the row.

28. The one or more computer-readable, non-volatile storage memory as recited in claim 24, wherein all events in the particular subset of the set of events have a different value in a different cell of the header row based at least on the selection of the option, and the second table includes a respective portion of raw machine data of each event in the particular subset of the set of events.

29. The one or more computer-readable, non-volatile storage memory as recited in claim 24, wherein no event in the particular subset of the set of events has the value in the cell of the header row, and the second table includes a respective portion of raw machine data of each event in the particular subset of the set of events.

30. The one or more computer-readable, non-volatile storage memory as recited in claim 24, wherein each row of a plurality of rows in the second interface corresponds to an event of the particular subset of the set of events.

* * * * *